(12) United States Patent
Eskridge et al.

(10) Patent No.: US 11,726,552 B1
(45) Date of Patent: Aug. 15, 2023

(54) SYSTEMS AND METHODS FOR RENDERING A TRIGGER FINGER

(71) Applicant: META PLATFORMS TECHNOLOGIES, LLC, Menlo Park, CA (US)

(72) Inventors: Melissa Kaye Eskridge, Seattle, WA (US); Valerie Susan Hanson, Seattle, WA (US); Madeline Blair Aby, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/381,994

(22) Filed: Jul. 21, 2021

Related U.S. Application Data

(60) Provisional application No. 63/182,479, filed on Apr. 30, 2021.

(51) Int. Cl.
  *G06F 3/033* (2013.01)
  *G06T 11/00* (2006.01)
  *G06F 3/02* (2006.01)
  *G06F 3/01* (2006.01)

(52) U.S. Cl.
  CPC .............. *G06F 3/011* (2013.01); *G06F 3/02* (2013.01); *G06F 3/0202* (2013.01); *G06F 3/033* (2013.01); *G06T 11/00* (2013.01)

(58) Field of Classification Search
  None
  See application file for complete search history.

(56) References Cited

U.S. PATENT DOCUMENTS

| | | | |
|---|---|---|---|
| 10,139,906 B1* | 11/2018 | Bai | G06F 3/014 |
| 2012/0256858 A1* | 10/2012 | Sudo | G06F 3/016 |
| | | | 345/173 |
| 2015/0277559 A1* | 10/2015 | Vescovi | G06F 3/017 |
| | | | 345/173 |
| 2016/0198995 A1* | 7/2016 | Yeung | A61B 5/1118 |
| | | | 600/595 |
| 2016/0246369 A1* | 8/2016 | Osman | A63F 13/212 |
| 2018/0188883 A1* | 7/2018 | Bytheway | A63F 13/218 |
| 2018/0361234 A1* | 12/2018 | Nietfeld | A63F 13/21 |
| 2019/0138107 A1* | 5/2019 | Nietfeld | G06F 3/0346 |
| 2020/0356183 A1* | 11/2020 | Kamepalli | G06F 3/021 |
| 2020/0356184 A1* | 11/2020 | Kamepalli | G06F 3/0489 |
| 2021/0081042 A1* | 3/2021 | Baier | G06F 3/0346 |
| 2021/0181842 A1* | 6/2021 | Kuji | G06F 3/017 |

* cited by examiner

*Primary Examiner* — Patrick N Edouard
*Assistant Examiner* — Peijie Shen
(74) *Attorney, Agent, or Firm* — Greenberg Traurig, LLP

(57) ABSTRACT

The disclosed computer-implemented method may include receiving, by a computing device, input from two or more proximity sensors configured to sense proximity, of two or more portions of a trigger finger of a user, to a trigger of a controller and to at least one part of the controller proximate to the trigger. The disclosed computer-implemented method may also include generating, by the computing device, an analog rendering of the trigger finger in response to the input from the two or more proximity sensors. Various other methods, systems, and computer-readable media are also disclosed.

19 Claims, 19 Drawing Sheets

Method 300

SYSTEMS AND METHODS FOR RENDERING A TRIGGER FINGER

CROSS REFERENCE TO RELATED APPLICATION

This application claims the benefit of U.S. Provisional Application No. 63/182,479 filed Apr. 30, 2021, the disclosure of which is incorporated, in its entirety, by this reference.

DETAILED DESCRIPTION OF EXEMPLARY EMBODIMENTS

Figure 1:
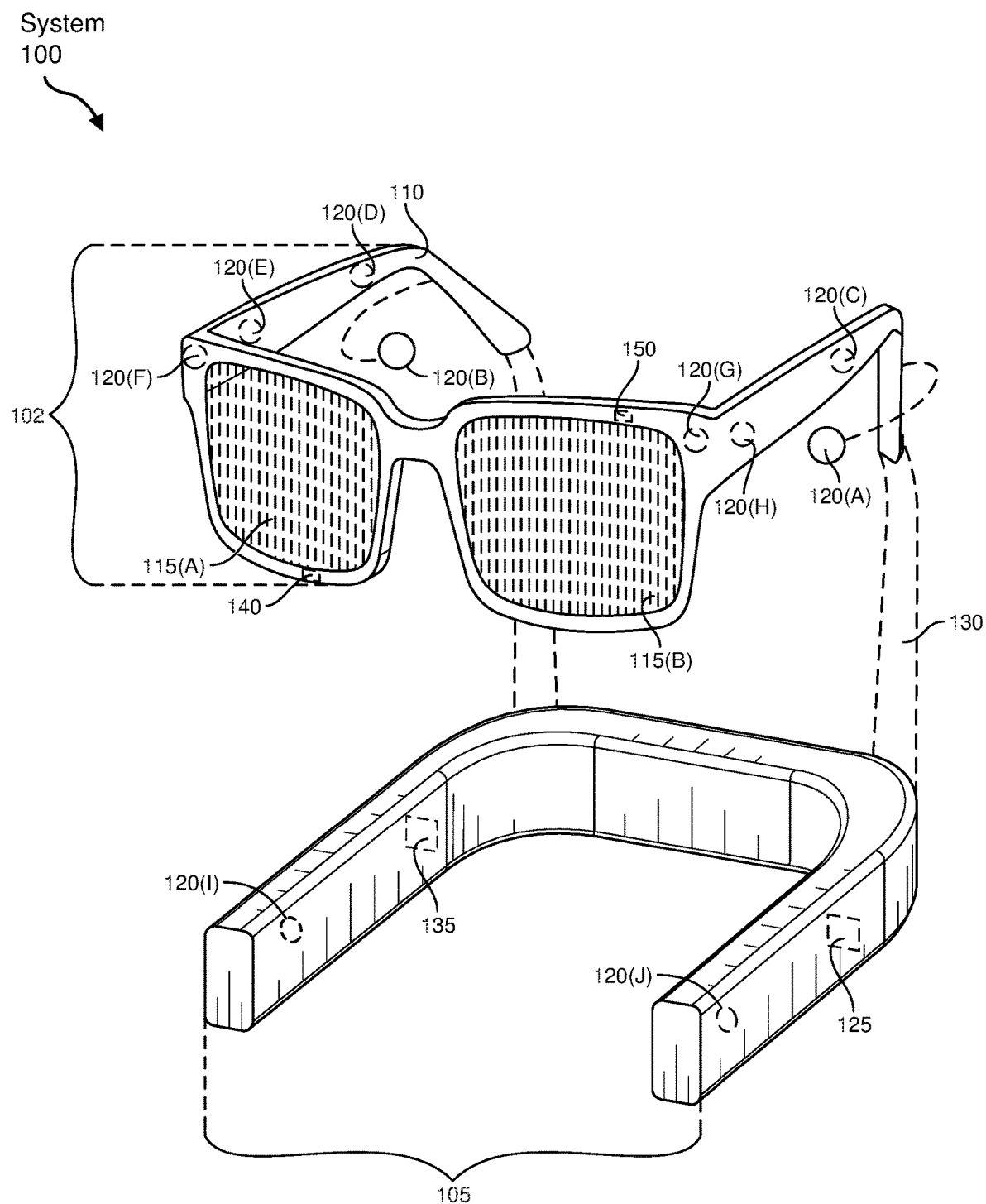
FIG. 1 is an illustration of exemplary augmented-reality glasses that may be used in connection with embodiments of this disclosure.

Conventional controllers for virtual reality (VR) systems have various sensors. For example, a conventional controller may have an analog thumb stick, two or more face buttons that can also be pressed with a thumb, a trigger designed for the index finger, and a second trigger that is activated by squeezing the rest of the fingers against the controller grip. A conventional controller may also be studded with a constellation of light emitting diodes (LEDs) that are invisible to the naked eye. These LEDs allow VR constellation sensors to track the position of the controller, which lets the user move their hands around and rotate them through a full range of motion.

In addition to these controls, the controller may have a number of proximity sensors, such as capacitive sensors, capable of locating fingers of a user. For example, the proximity sensor input can indicate whether the index finger (or other finger) of the user is resting on the trigger, or whether the thumb is resting on a face button or thumb stick. This sensory data may enable the user to perform complex gestures like pointing fingers and balling fists. Furthermore, input from the trigger sensor may be used by a VR system to render a trigger finger of the user in the virtual reality environment. Rendering the trigger finger may provide feedback to opponents, teammates, and others, and the proximity sensor allows the system to predict the engagement of the trigger in time to render it accurately in terms of timing. However, input from the trigger sensor is only sufficient to allow a binary rendering of the finger. That is, the finger is rendered with only two images: pointed or fully curled.

The present disclosure is generally directed to addition of a proximity sensor near a trigger of a controller. This sensor may be positioned to sense proximity of another part of the trigger finger, such as a base of the index finger. Sensory input from the trigger sensor and the additional sensor may be used in combination to generate an analog rendering (i.e., three or more images/positions) of the trigger finger. As a result, a rendering of the trigger finger may be provided that shows at least a partially curled finger position in addition to the fully curled and pointed finger positions.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 100 in FIG. 1) or that visually immerses a user in an artificial reality (such as, e.g., virtual-reality system 200 in FIG. 2). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 2:
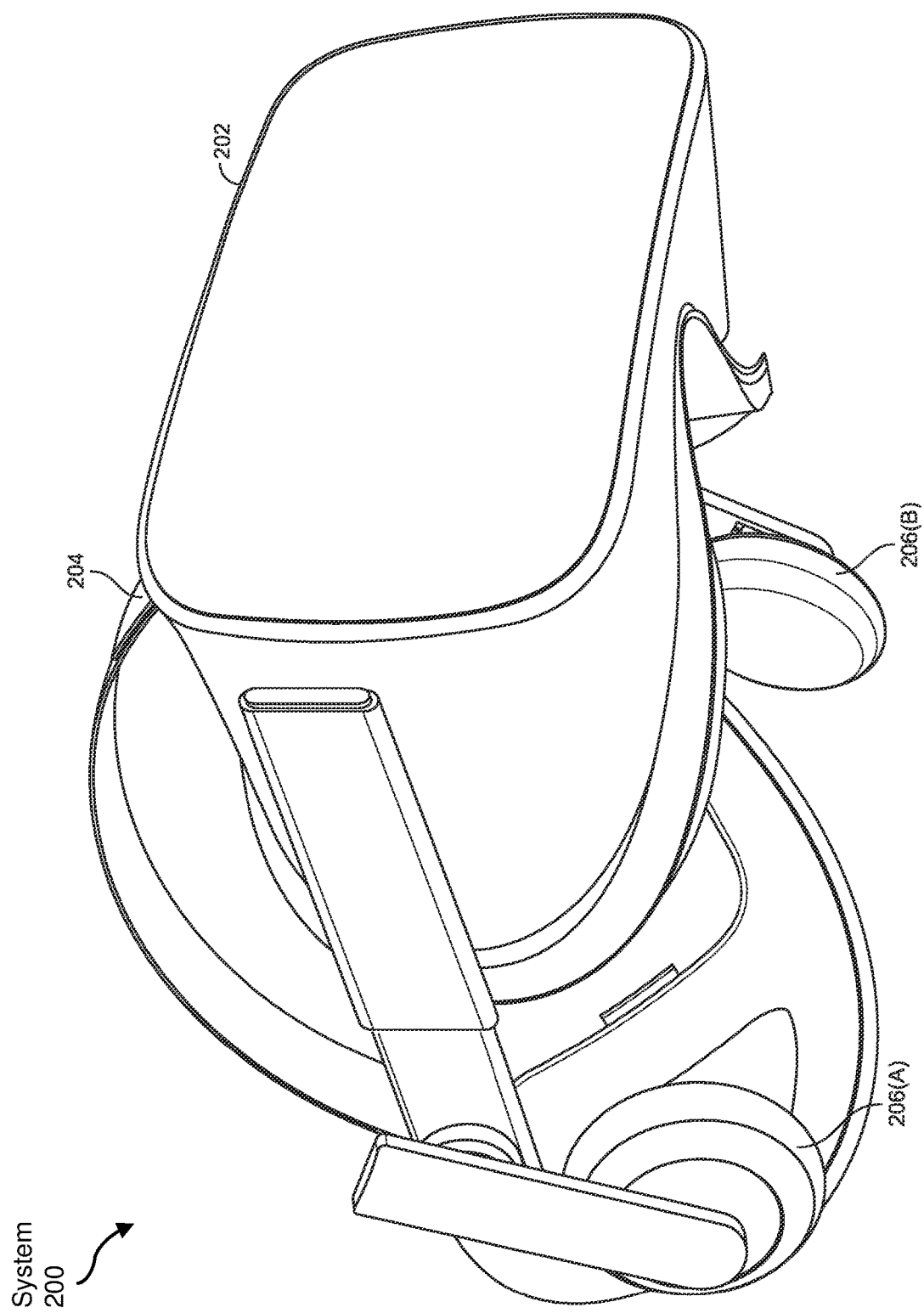
FIG. 2 is an illustration of an exemplary virtual-reality headset that may be used in connection with embodiments of this disclosure.

Turning to FIG. 1, augmented-reality system 100 may include an eyewear device 102 with a frame 110 configured to hold a left display device 115(A) and a right display device 115(B) in front of a user's eyes. Display devices 115(A) and 115(B) may act together or independently to present an image or series of images to a user. While augmented-reality system 100 includes two displays, embodiments of this disclosure may be implemented in augmented-reality systems with a single NED or more than two NEDs.

In some embodiments, augmented-reality system 100 may include one or more sensors, such as sensor 140. Sensor 140 may generate measurement signals in response to motion of augmented-reality system 100 and may be located on substantially any portion of frame 110. Sensor 140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 100 may or may not include sensor 140 or may include more than one sensor. In embodiments in which sensor 140 includes an IMU, the IMU may generate calibration data based on measurement signals from sensor 140. Examples of sensor 140 may include, without limitation, accelerometers, gyroscopes, magnetometers, other suitable types of sensors that detect motion, sensors used for error correction of the IMU, or some combination thereof.

In some examples, augmented-reality system 100 may also include a microphone array with a plurality of acoustic transducers 120(A)-120(J), referred to collectively as acoustic transducers 120. Acoustic transducers 120 may represent transducers that detect air pressure variations induced by sound waves. Each acoustic transducer 120 may be configured to detect sound and convert the detected sound into an electronic format (e.g., an analog or digital format). The microphone array in FIG. 1 may include, for example, ten acoustic transducers: 120(A) and 120(B), which may be designed to be placed inside a corresponding ear of the user, acoustic transducers 120(C), 120(D), 120(E), 120(F), 120(G), and 120(H), which may be positioned at various locations on frame 110, and/or acoustic transducers 120(I) and 120(J), which may be positioned on a corresponding neckband 105.

In some embodiments, one or more of acoustic transducers 120(A)-(J) may be used as output transducers (e.g., speakers). For example, acoustic transducers 120(A) and/or 120(B) may be earbuds or any other suitable type of headphone or speaker.

The configuration of acoustic transducers 120 of the microphone array may vary. While augmented-reality system 100 is shown in FIG. 1 as having ten acoustic transducers 120, the number of acoustic transducers 120 may be greater or less than ten. In some embodiments, using higher numbers of acoustic transducers 120 may increase the amount of audio information collected and/or the sensitivity and accuracy of the audio information. In contrast, using a lower number of acoustic transducers 120 may decrease the computing power required by an associated controller 150 to process the collected audio information. In addition, the position of each acoustic transducer 120 of the microphone array may vary. For example, the position of an acoustic transducer 120 may include a defined position on the user, a defined coordinate on frame 110, an orientation associated with each acoustic transducer 120, or some combination thereof.

Acoustic transducers 120(A) and 120(B) may be positioned on different parts of the user's ear, such as behind the pinna, behind the tragus, and/or within the auricle or fossa. Or, there may be additional acoustic transducers 120 on or surrounding the ear in addition to acoustic transducers 120 inside the ear canal. Having an acoustic transducer 120 positioned next to an ear canal of a user may enable the microphone array to collect information on how sounds arrive at the ear canal. By positioning at least two of acoustic transducers 120 on either side of a user's head (e.g., as binaural microphones), augmented-reality device 100 may simulate binaural hearing and capture a 3D stereo sound field around about a user's head. In some embodiments, acoustic transducers 120(A) and 120(B) may be connected to augmented-reality system 100 via a wired connection 130, and in other embodiments acoustic transducers 120(A) and 120(B) may be connected to augmented-reality system 100 via a wireless connection (e.g., a BLUETOOTH connection). In still other embodiments, acoustic transducers 120(A) and 120(B) may not be used at all in conjunction with augmented-reality system 100.

Acoustic transducers 120 on frame 110 may be positioned in a variety of different ways, including along the length of the temples, across the bridge, above or below display devices 115(A) and 115(B), or some combination thereof. Acoustic transducers 120 may also be oriented such that the microphone array is able to detect sounds in a wide range of directions surrounding the user wearing the augmented-reality system 100. In some embodiments, an optimization process may be performed during manufacturing of augmented-reality system 100 to determine relative positioning of each acoustic transducer 120 in the microphone array.

In some examples, augmented-reality system 100 may include or be connected to an external device (e.g., a paired device), such as neckband 105. Neckband 105 generally represents any type or form of paired device. Thus, the following discussion of neckband 105 may also apply to various other paired devices, such as charging cases, smart watches, smart phones, wrist bands, other wearable devices, hand-held controllers, tablet computers, laptop computers, other external compute devices, etc.

As shown, neckband 105 may be coupled to eyewear device 102 via one or more connectors. The connectors may be wired or wireless and may include electrical and/or non-electrical (e.g., structural) components. In some cases, eyewear device 102 and neckband 105 may operate independently without any wired or wireless connection between them. While FIG. 1 illustrates the components of eyewear device 102 and neckband 105 in example locations on eyewear device 102 and neckband 105, the components may be located elsewhere and/or distributed differently on eyewear device 102 and/or neckband 105. In some embodiments, the components of eyewear device 102 and neckband 105 may be located on one or more additional peripheral devices paired with eyewear device 102, neckband 105, or some combination thereof.

Pairing external devices, such as neckband 105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 100 may be provided by a paired device or shared between a paired device and an eyewear device, thus reducing the weight, heat profile, and form factor of the eyewear device overall while still retaining desired functionality. For example, neckband 105 may allow components that would otherwise be included on an eyewear device to be included in neckband 105 since users may tolerate a heavier weight load on their shoulders than they would tolerate on their heads. Neckband 105 may also have a larger surface area over which to diffuse and disperse heat to the ambient environment. Thus, neckband 105 may allow for greater battery and computation capacity than might otherwise have been possible on a stand-alone eyewear device. Since weight carried in neckband 105 may be less invasive to a user than weight carried in eyewear device 102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 105 may be communicatively coupled with eyewear device 102 and/or to other devices. These other devices may provide certain functions (e.g., tracking, localizing, depth mapping, processing, storage, etc.) to augmented-reality system 100. In the embodiment of FIG. 1, neckband 105 may include two acoustic transducers (e.g., 120(I) and 120(J)) that are part of the microphone array (or potentially form their own microphone subarray). Neckband 105 may also include a controller 125 and a power source 135.

Acoustic transducers 120(I) and 120(J) of neckband 105 may be configured to detect sound and convert the detected sound into an electronic format (analog or digital). In the embodiment of FIG. 1, acoustic transducers 120(I) and 120(J) may be positioned on neckband 105, thereby increasing the distance between the neckband acoustic transducers 120(I) and 120(J) and other acoustic transducers 120 positioned on eyewear device 102. In some cases, increasing the distance between acoustic transducers 120 of the microphone array may improve the accuracy of beamforming performed via the microphone array. For example, if a sound is detected by acoustic transducers 120(C) and 120(D) and the distance between acoustic transducers 120(C) and 120 (D) is greater than, e.g., the distance between acoustic transducers 120(D) and 120(E), the determined source location of the detected sound may be more accurate than if the sound had been detected by acoustic transducers 120(D) and 120(E).

Controller 125 of neckband 105 may process information generated by the sensors on neckband 105 and/or augmented-reality system 100. For example, controller 125 may process information from the microphone array that describes sounds detected by the microphone array. For each detected sound, controller 125 may perform a direction-of-arrival (DOA) estimation to estimate a direction from which the detected sound arrived at the microphone array. As the microphone array detects sounds, controller 125 may populate an audio data set with the information. In embodiments in which augmented-reality system 100 includes an inertial measurement unit, controller 125 may compute all inertial and spatial calculations from the IMU located on eyewear device 102. A connector may convey information between augmented-reality system 100 and neckband 105 and between augmented-reality system 100 and controller 125. The information may be in the form of optical data, electrical data, wireless data, or any other transmittable data form. Moving the processing of information generated by augmented-reality system 100 to neckband 105 may reduce weight and heat in eyewear device 102, making it more comfortable to the user.

Power source 135 in neckband 105 may provide power to eyewear device 102 and/or to neckband 105. Power source 135 may include, without limitation, lithium ion batteries, lithium-polymer batteries, primary lithium batteries, alkaline batteries, or any other form of power storage. In some cases, power source 135 may be a wired power source. Including power source 135 on neckband 105 instead of on eyewear device 102 may help better distribute the weight and heat generated by power source 135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 200 in FIG. 2, that mostly or completely covers a user's field of view. Virtual-reality system 200 may include a front rigid body 202 and a band 204 shaped to fit around a user's head. Virtual-reality system 200 may also include output audio transducers 206(A) and 206(B). Furthermore, while not shown in FIG. 2, front rigid body 202 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 100 and/or virtual-reality system 200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 100 and/or virtual-reality system 200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 100 and/or virtual-reality system 200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

A part of the visual content provided by a virtual-reality system may include rendering of users. For example, a rendering of a user's hand and controller may provide immersive feedback for other users. By adding a proximity sensor near a trigger of the controller, sensory input from a trigger sensor and an additional sensor may be used in combination to generate an analog rendering (i.e., three or more images/positions) of the trigger finger. As a result, a rendering of the trigger finger may be provided that shows at least a partially curled finger position in addition to the fully curled and pointed finger positions.

Figure 3:
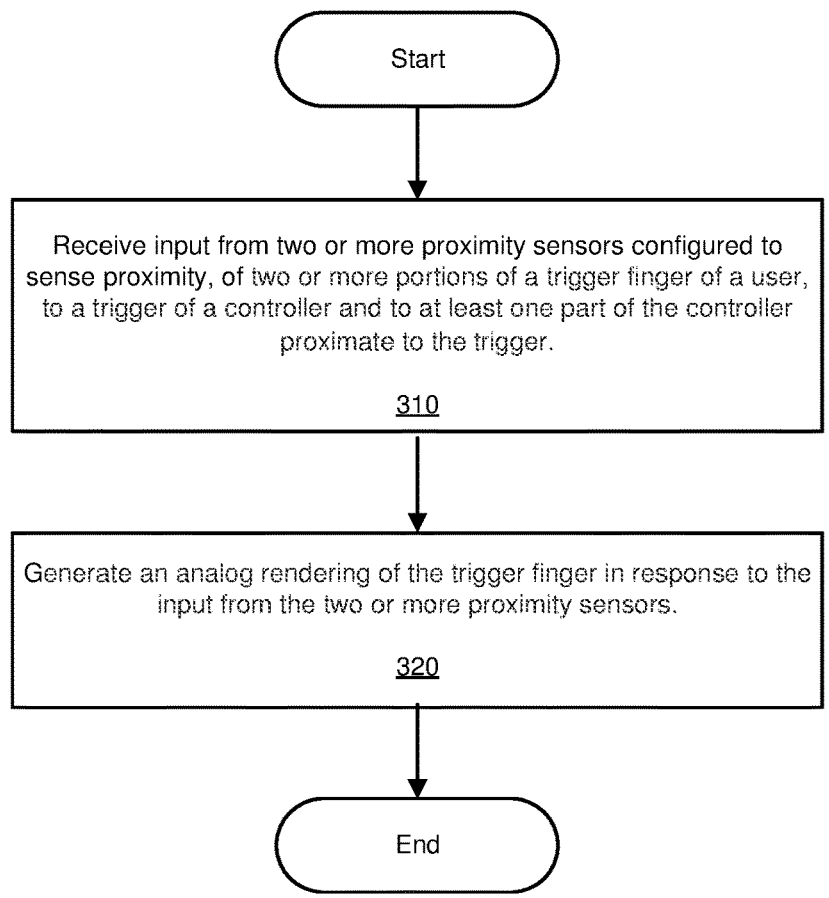
FIG. 3 is a flow diagram illustrating a method of rendering a trigger finger in accordance with embodiments of this disclosure.
Figure 6:
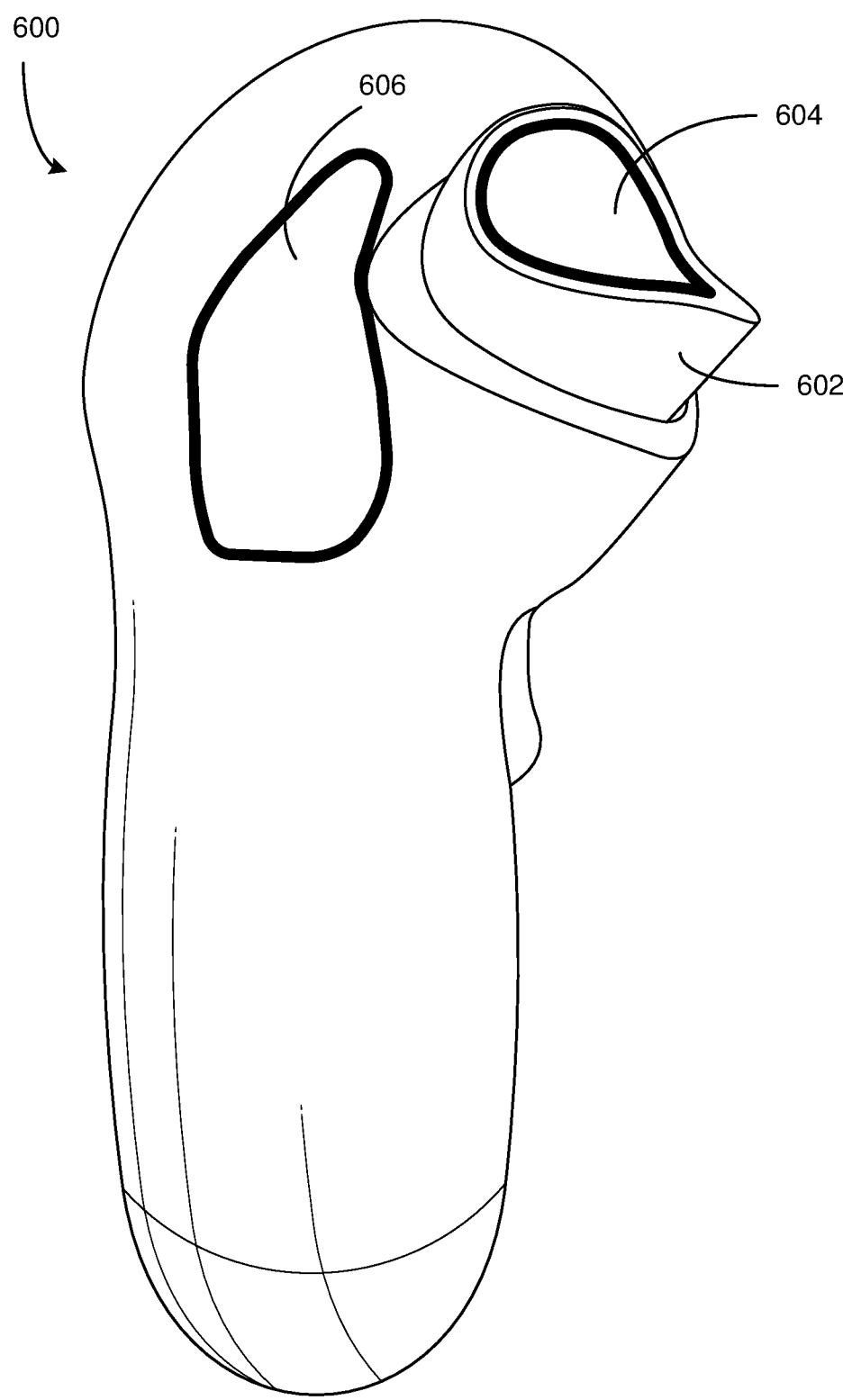
FIG. 6 is a perspective view of a controller having proximity sensors in accordance with embodiments of this disclosure.

Referring to FIG. 3, a method 300 of rendering a trigger finger begins at step 310, in which a virtual reality (VR) system receives input from two or more proximity sensors. The proximity sensors are configured to sense proximity of two or more portions of a trigger finger of a user to a trigger of a controller and to at least one part of the controller proximate to the trigger. For example, as shown in FIG. 6, an example controller 600 of a VR system has a trigger 602 with a first proximity sensor 604 disposed in or on the trigger 602 and a second proximity sensor 606 positioned near the trigger 602. In this example, the second proximity sensor is positioned to detect proximity of a base of the trigger finger.

Figure 5:
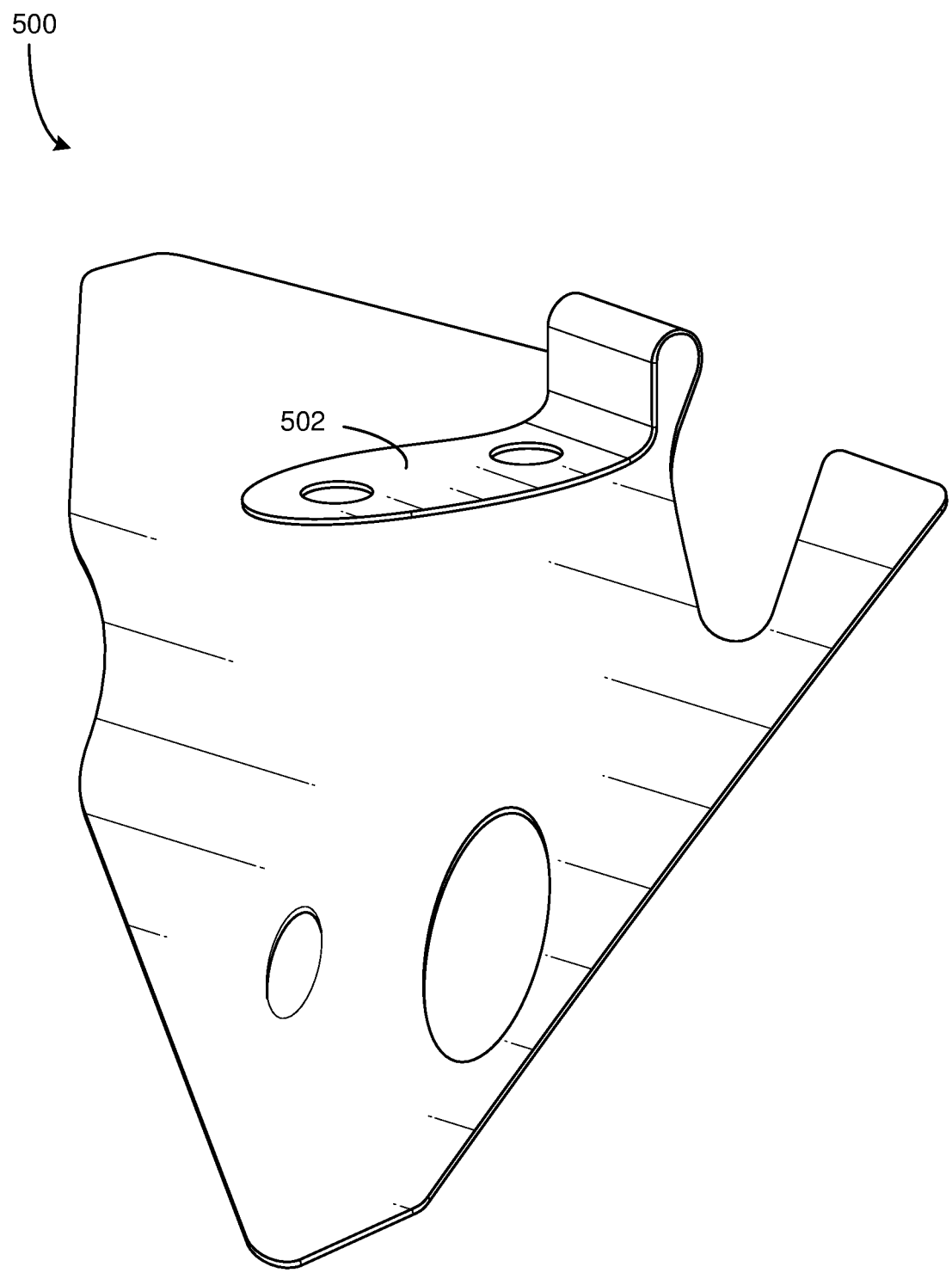
FIG. 5 is a perspective view of a proximity sensor in accordance with embodiments of this disclosure.

As used herein, "proximity sensor" generally refers to any type of sensor capable of sensing proximity. More specifically, such a sensor detects the presence of nearby objects without any physical contact. A proximity sensor often emits an electromagnetic field or a beam of electromagnetic radiation (infrared, for instance), and looks for changes in the field or return signal. For example, it is envisioned that the proximity sensors used herein may be capacitance sensors, inductive sensors, ultrasonic sensors, infrared sensors, cameras that track points of reference, or any other type of sensor capable of sensing proximity. In the example shown in FIG. 5, a capacitance sensor 500 formed of sheet metal may be used. The sensor may have a protrusion 502 configured to interface with a microchip of the controller. The input received is step 302 may be received by the microcontroller via the protrusion 502.

As used herein, "trigger" generally refers to a trigger switch commonly used in game controllers and other user interface devices. A trigger switch is a type of physical user interface component having a tension mechanism, such as a spring, that returns the elongated member to a non-actuated position. The trigger may be configured as a depressible button, or it may be hinged at one end. The trigger herein is configured to be actuated by a finger (e.g., index finger) of a user of the controller.

Figure 7:
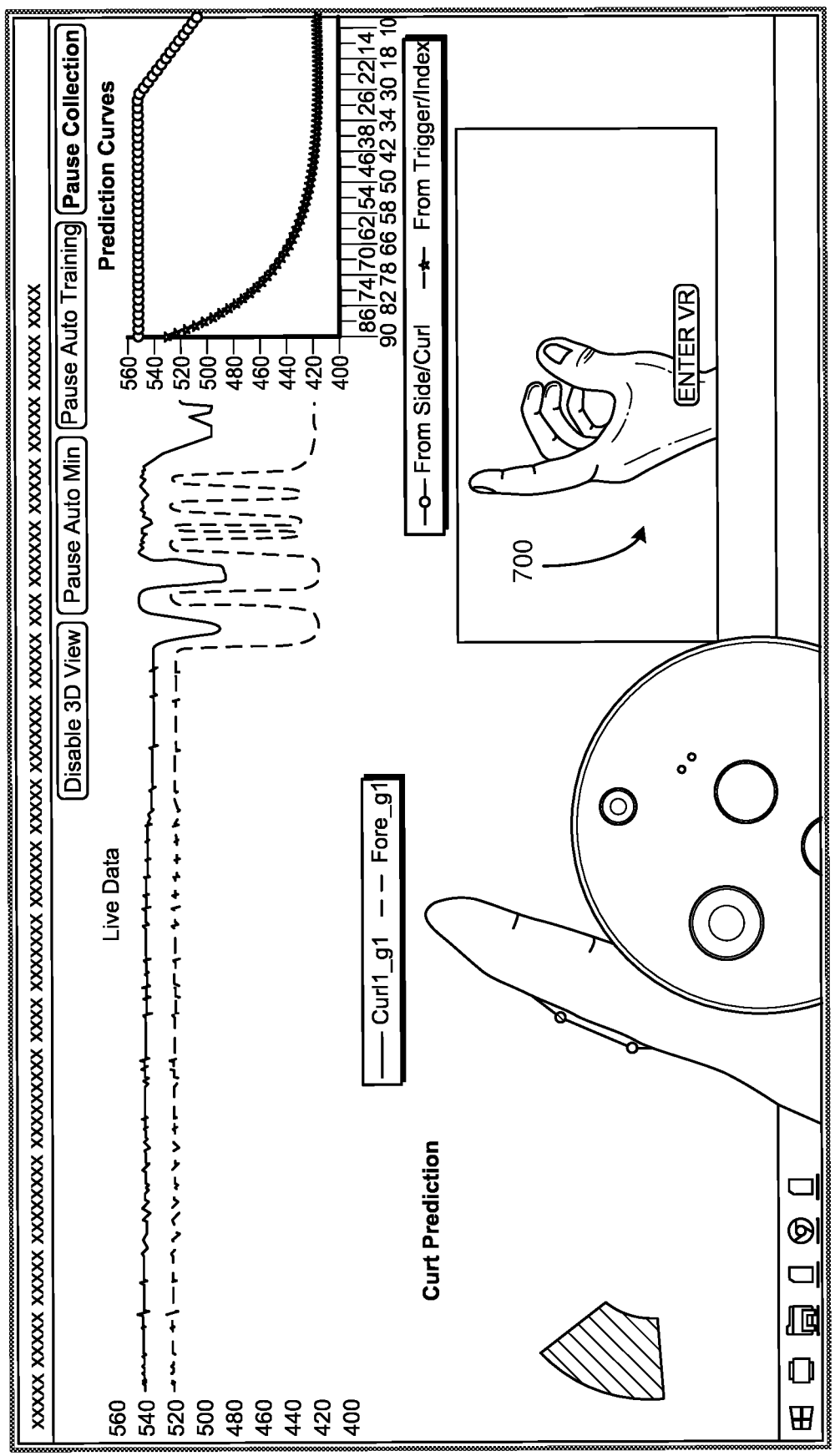
FIG. 7 is a view of a first image of an analog rendering of a trigger finger in accordance with embodiments of this disclosure.
Figure 8:
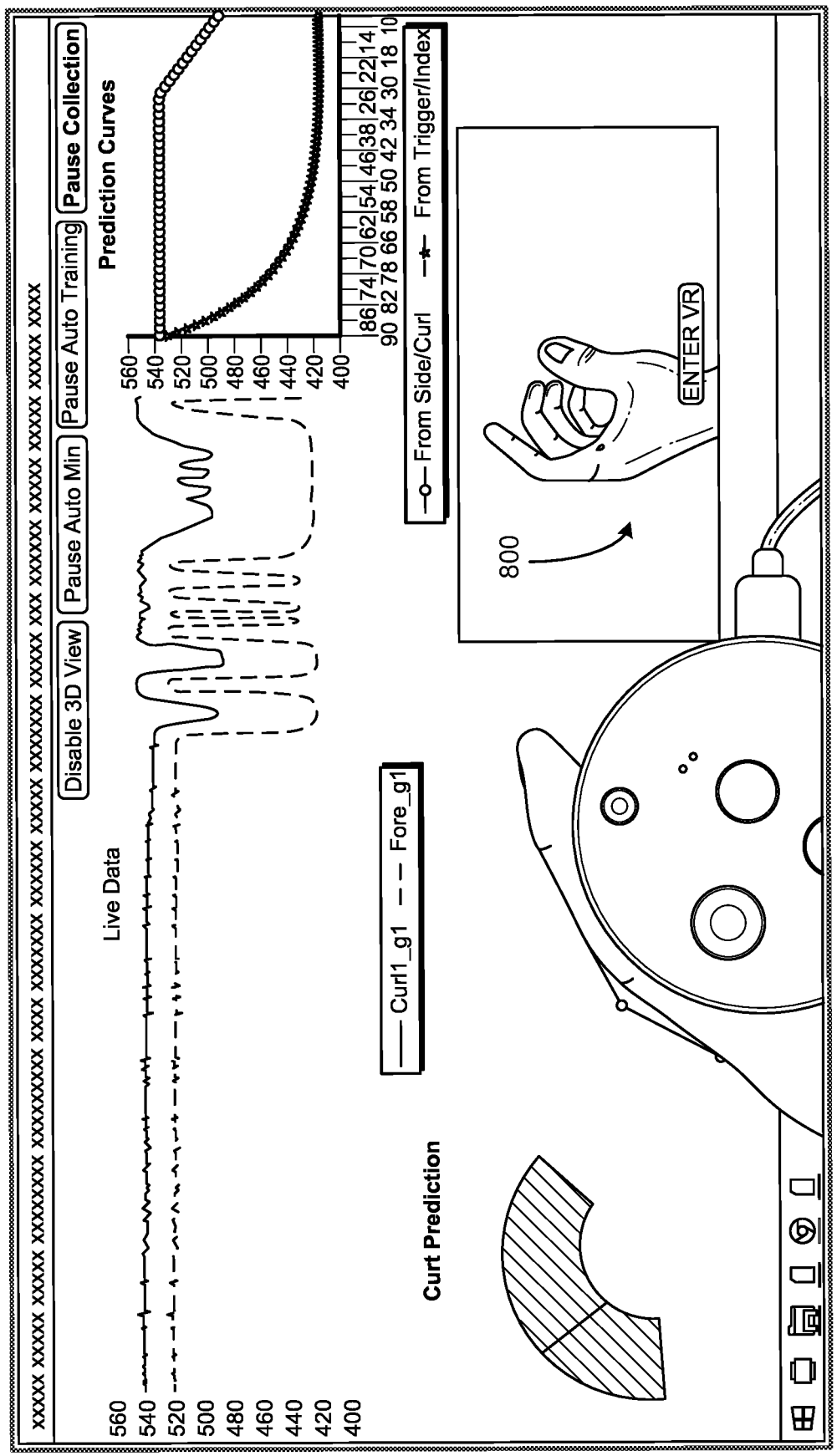
FIG. 8 is a view of a second image of an analog rendering of a trigger finger in accordance with embodiments of this disclosure.
Figure 9:
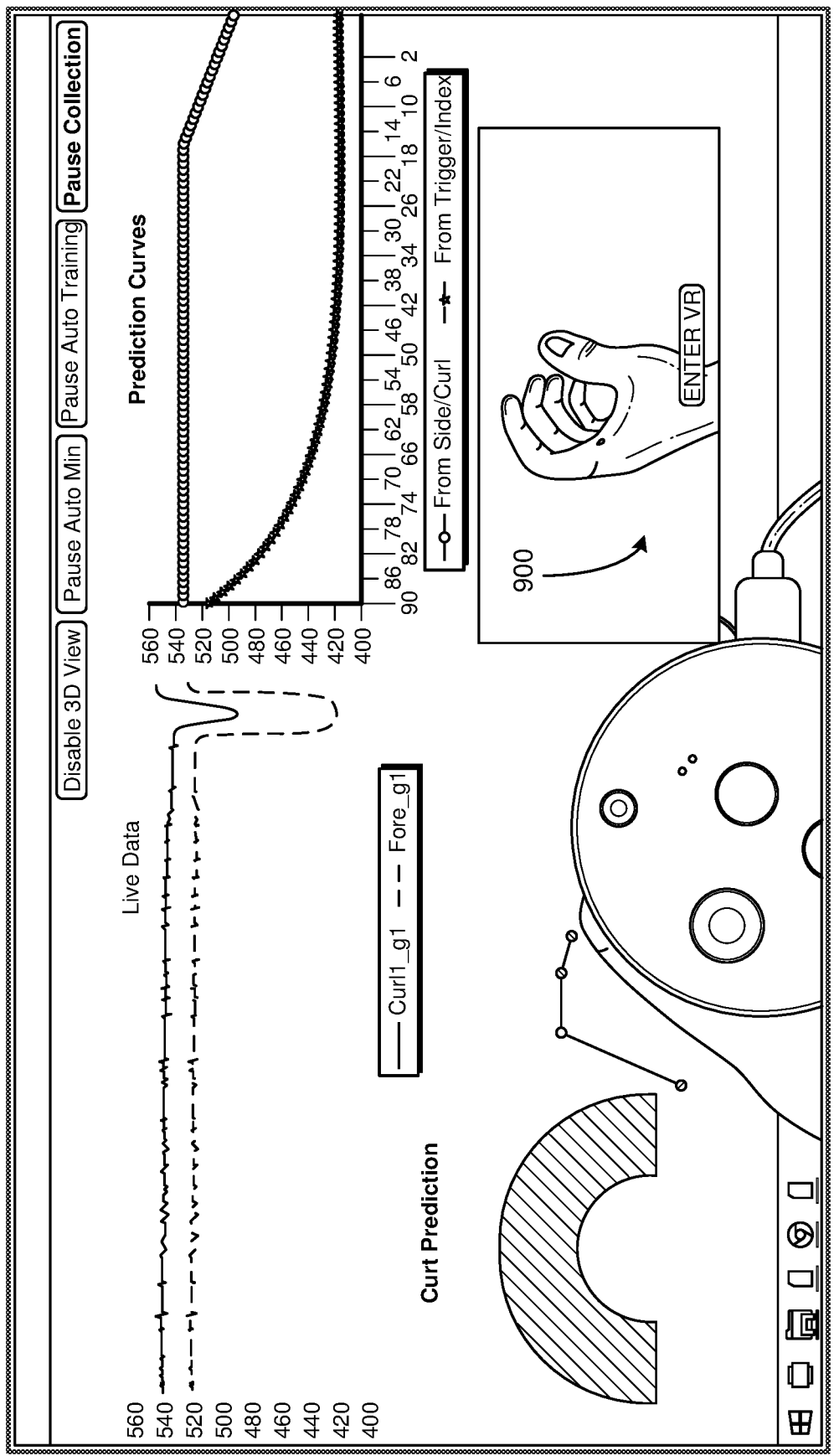
FIG. 9 is a view of a third image of an analog rendering of a trigger finger in accordance with embodiments of this disclosure.

Method 300 may proceed from step 310 to step 320, which involves generating an analog rendering of the trigger finger in response to the input, received in step 310, from the two or more proximity sensors. For example, FIGS. 7-9 show an example analog rendering in which at least three different images 700, 800, and 900 are generated. Image 700 corresponds to an image of the trigger finger in a pointed position that is rendered when input from both proximity sensors indicates that proximity of the trigger finger is minimal (e.g., at a minimum value). Image 800 corresponds to an image of the trigger finger in a partially curled position that is rendered when input from the sensors indicates that the base of the trigger finger is sufficiently proximate to the sensor near the trigger to produce a maximum value sensed by that sensor, but the tip of the trigger finger is not sufficiently proximate to the trigger sensor to produce a maximum value sensed by the trigger sensor. Image 900 corresponds to an image of the trigger finger in a fully curled position that is rendered when the input from the proximity sensors indicates that the trigger finger is sufficiently proximate to cause maximum values to be sensed by both sensors.

In embodiments in which the proximity sensors are both capacitive sensors, a "curl" electrode may be positioned on the outside of the controller, alongside and below the trigger. The curl electrode may detect how far the base of the trigger finger is lifting away from the controller. Similarly, a trigger electrode may be positioned in the trigger and detect how close the trigger finger is to touching the trigger.

As used herein, "analog rendering" generally refers to a series of three or more different images depicting a finger in three or more positions. For example, it may correspond to three images, including a partially curled finger position in addition to the fully curled and pointed finger positions. Alternatively or additionally, it may include many more than three images, including a series of many different images of partially curled finger positions. When enacted by a VR system, generating the analog rendering may include dynamic display of the three or more images via the VR system user interface output components.

In some implementations, step 304 may include several procedures, such as dynamic normalization of sensor values, controller pickup detection, a two-segment fit process, educated guess prediction, and one-dimensional curl projection. These procedures are described herein with reference to FIGS. 10-19. For example, dynamic normalization of sensor values is detailed with reference to FIGS. 10-13, and controller pickup detection is detailed with reference to FIG. 14. Additionally, the two-segment fit procedure is detailed with respect to FIGS. 15 and 16, and the educated guess prediction is detailed with reference to FIGS. 17 and 18. Finally, the one-dimensional curl projection is detailed with reference to FIG. 19. Thus, further details of these procedures are provided herein following discussion of FIG. 4.

Figure 4:
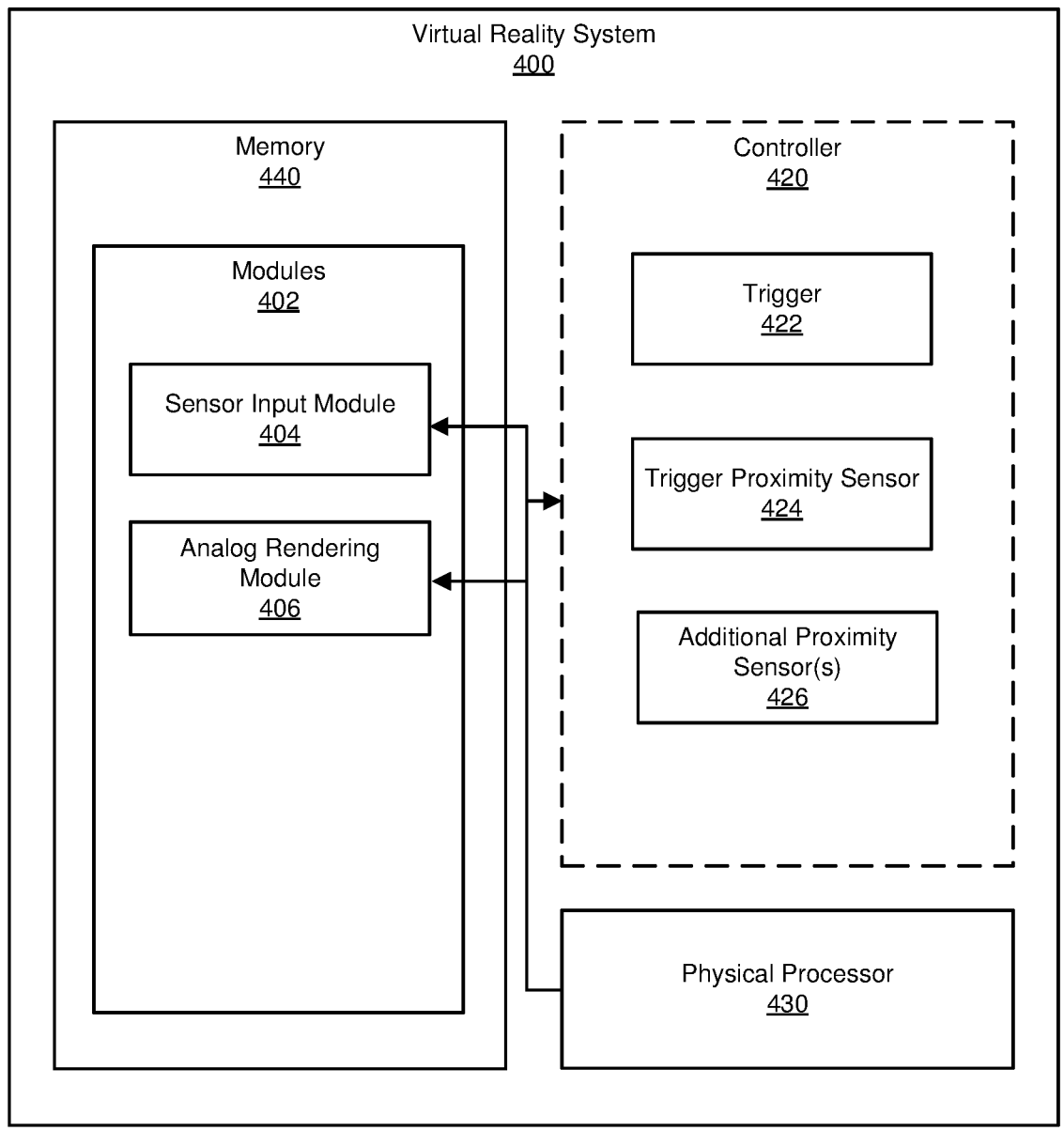
FIG. 4 is a block diagram illustrating a virtual reality system in accordance with embodiments of this disclosure.

A VR system may be implemented in any suitable manner. Referring to FIG. 4, an exemplary VR system 400 includes at least one physical processor 430, physical memory 440 comprising computer-executable instructions such as modules 402, and additional elements 420, such as trigger 422, a trigger proximity sensor 424, and one or more additional proximity sensor(s) 426. When executed by the physical processor, the modules 402 cause physical processor 430 to carry out various operations. For example, sensor input module 404 may execute procedures described above with reference to step 310 of method 300 of FIG. 3. Additionally, analog rendering module 406 may execute procedures described above with reference to step 320 of method 300 of FIG. 3.

Figure 10:
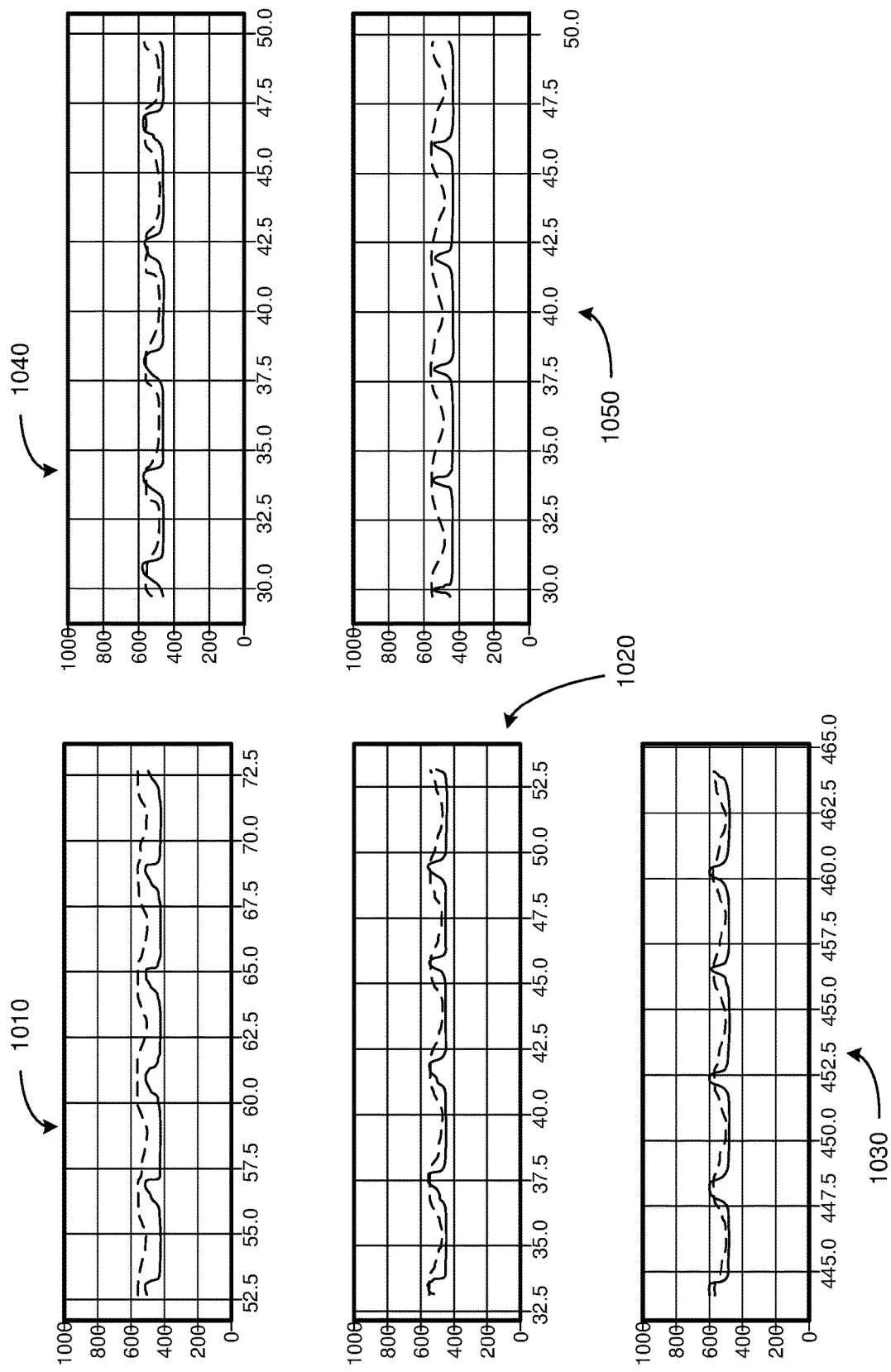
FIG. 10 is a graphical illustration depicting examples of raw sensor data of numerous users in accordance with embodiments of this disclosure.
Figure 11:
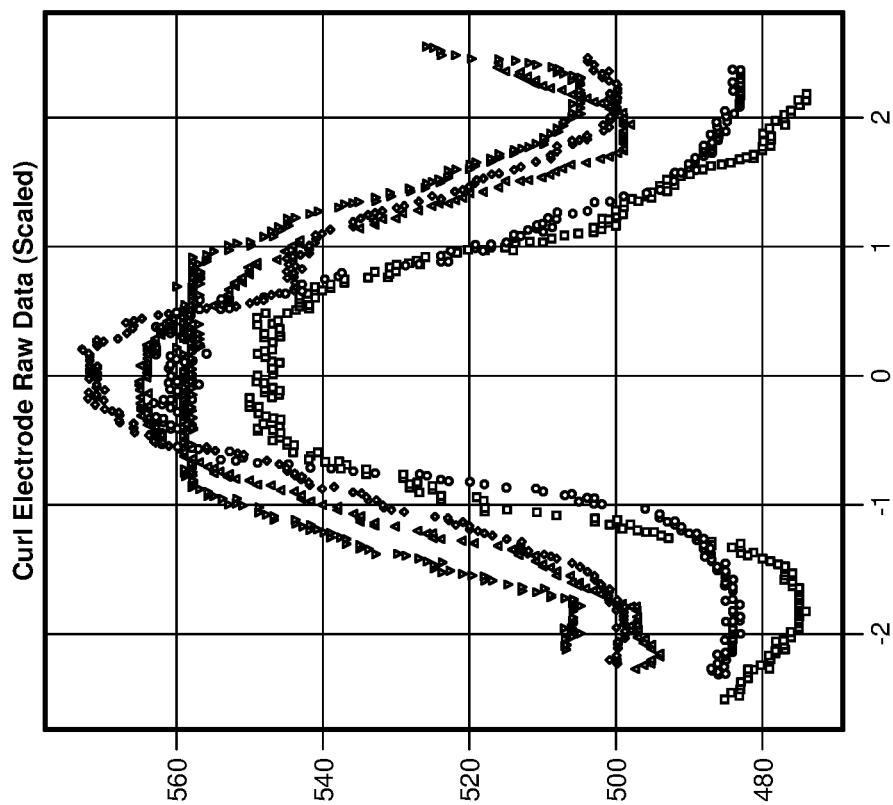
FIG. 11 is a graphical illustration depicting the raw sensor data of FIG. 10 in an overlay format in accordance with embodiments of this disclosure.
Figure 11:
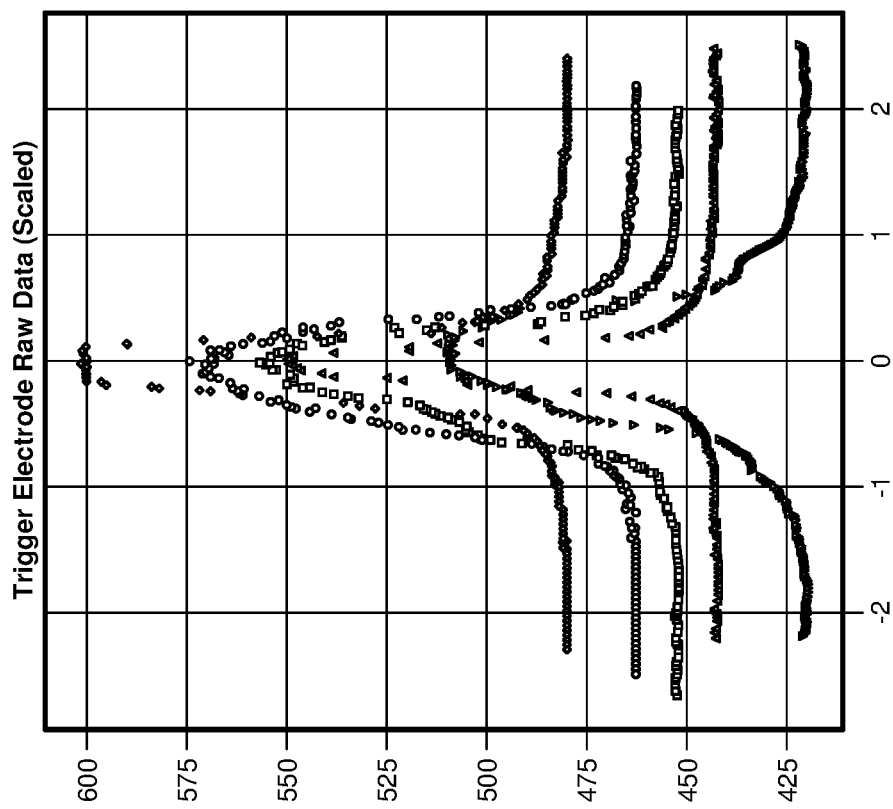

Turning to FIG. 10, examples 1010-1050 of raw sensor data of numerous users exhibit similarities and differences of such sensor data. The illustrated graphs depict capacitance on the ordinate axis and time on the abscissa. Thus, as the users curl and uncurl their trigger fingers over a four second period of time, a higher value on the ordinate axis indicates greater proximity. These examples 1010-1050 demonstrate that different users curl and uncurl their fingers differently, and they also demonstrate that different hand sizes and/or grips affect absolute values of the sensor data. FIG. 11 provides an overlay of the raw sensor data of FIG. 10 and demonstrates more clearly that the absolute values of the raw sensor data are different for different users.

Figure 12:
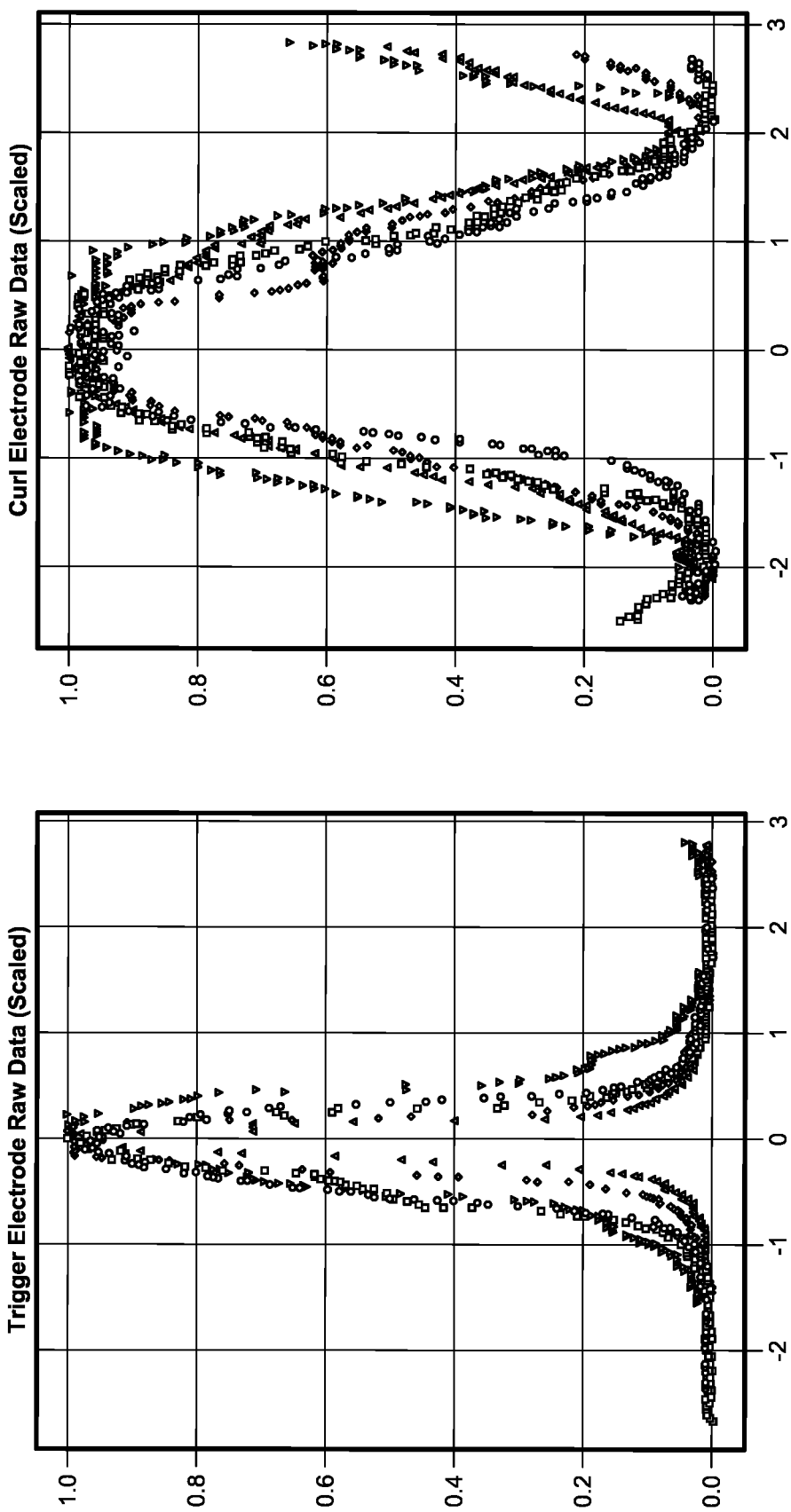
FIG. 12 is a graphical illustration depicting normalized sensor data in accordance with embodiments of this disclosure.

Turning to FIG. 12, the present disclosure addresses the issue of the different absolute values at least in part by normalizing the sensor data dynamically. Normalizing the data increases similarity of the shapes of the sensor data curves produced by different users sufficiently to make it possible to use the minimum and maximum values to make curves that are suitable for all users. A dynamic normalization strategy is detailed with reference to FIG. 13.

Figure 13:
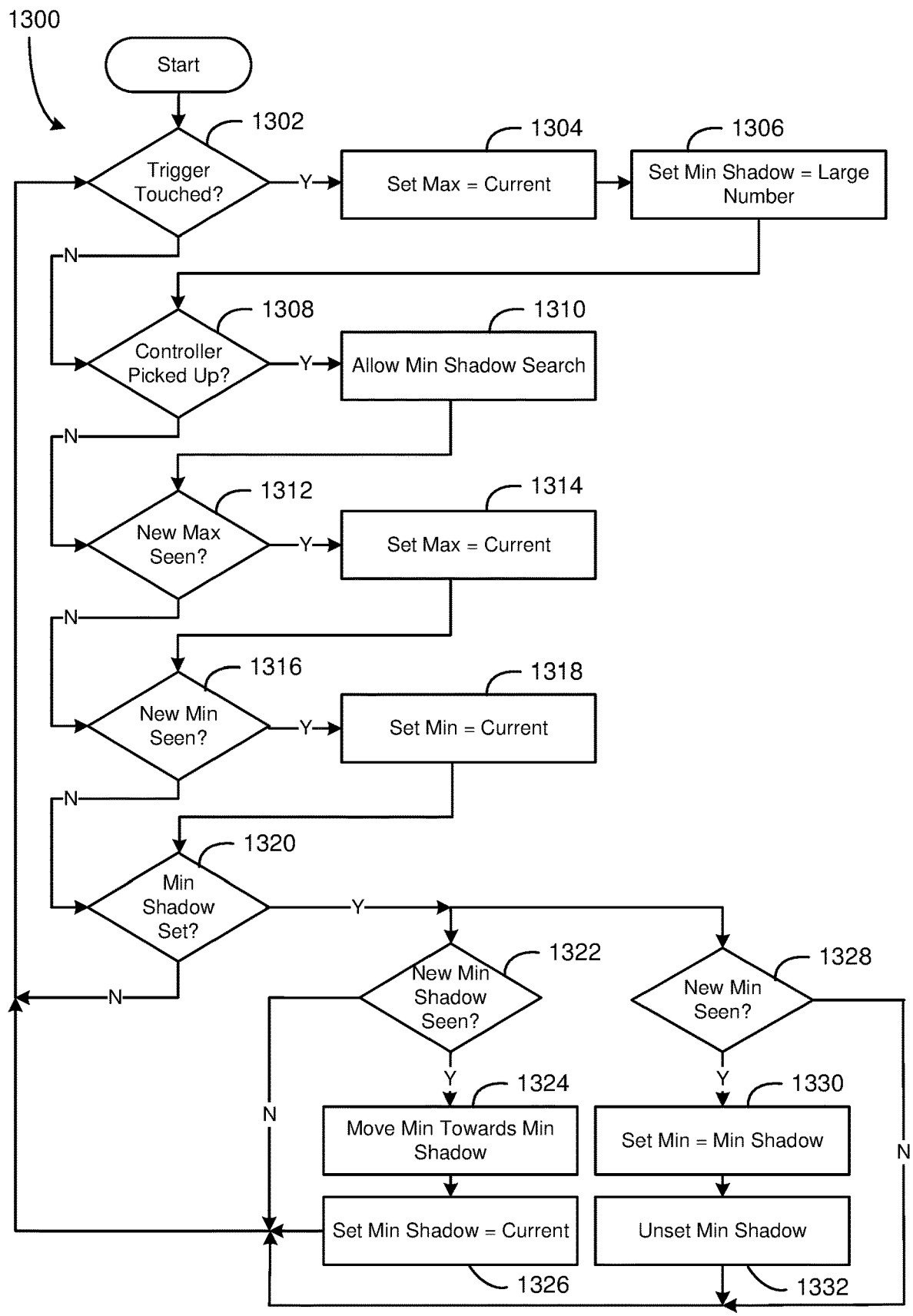
FIG. 13 is a flow diagram illustrating a dynamic normalization strategy in accordance with embodiments of this disclosure.

As shown in FIG. 13, a dynamic normalization strategy 1300 may be used to find the maximum and minimum values of sensor data for the curl electrode, the trigger electrode, or both. The disclosed process particularly addresses a difficulty that may arise in finding the minimum value when a user lets go of the controller or hyper extends the trigger finger. Beginning, for example, at decision step 1302, the process may include determining if the trigger is touched. Touching of the trigger may be determined by detecting user actuation of the trigger. If it is determined, at decision step 1302, that the trigger has not been touched, then processing may proceed to decision step 1308. Otherwise, processing may proceed to steps 1304 and 1306, in which a maximum value variable is set to a current sensor value and a minimum shadow variable may be set to a large number. The minimum shadow variable serves as a rate control on changes in a minimum value variable to prevent jerky movements. Setting the minimum shadow variable to a large number starts and/or restarts a search for a new minimum value. Following steps 1304 and 1306, processing may proceed to decision step 1308.

At decision step 1308, the dynamic normalization strategy 1300 may determine if the controller is picked up. An example procedure for determining if the controller is picked up is described later with reference to FIG. 14. If the dynamic normalization strategy 1300 determines, at decision step 1308, that the controller is not picked up, then processing may proceed to decision step 1312. Otherwise, if the dynamic normalization strategy 1300 determines, at decision step 1308, that the controller is picked up, processing may proceed to step 1310, at which a minimum shadow search is allowed. Allowing a minimum shadow search may involve, for example, setting the minimum shadow variable to a large number as in step 1306. Alternatively, it may involve unsetting the minimum shadow variable (e.g., setting the minimum shadow variable to a null value). Causing the minimum shadow variable to become unset in this way may cause the minimum shadow variable to be set to a large number at step 1306 when it is determined that the trigger has been touched at decision step 1302. Following step 1310, processing may proceed to decision step 1312.

At decision step 1312, the dynamic normalization strategy 1300 may determine if a new maximum value is observed. If not, then processing may proceed to decision step 1316. Otherwise, processing may proceed to step 1314, at which a maximum value variable is set to a current sensor value. Following step 1314, processing may proceed to decision step 1316.

At decision step 1316, the dynamic normalization strategy 1300 may determine if a new minimum value is observed. If not, then processing may proceed to decision step 1320. Otherwise, processing may proceed to step 1318, at which a minimum value variable is set to a current sensor value. Following step 1318, processing may proceed to decision step 1320.

At decision step 1320, the dynamic normalization strategy 1300 may determine if the minimum shadow variable is set. If not, then processing may return to step 1302. Otherwise processing may proceed to decision steps 1322 and 1328.

At decision step 1322, the dynamic normalization strategy 1300 may determine if a new minimum shadow is observed. Such a new minimum shadow may be observed when a sensor value is lower than the large number set in step 1306. Alternatively or additionally, a new minimum shadow may be observed when the controller is handed to another user for whom a lower minimum sensor value may be sensed. If a new minimum shadow is not observed at decision step 1322, then processing may return to step 1302. Otherwise, processing may proceed to steps 1324 and 1326. In step 1324, the minimum value variable is moved toward a stored minimum shadow variable value. In step 1326, the minimum shadow variable is set equal to the newly observed minimum sensed value. Processing may return from step 1326 to decision step 1302.

At decision step 1328, the dynamic normalization strategy 1300 may determine if a new minimum value is observed. If not, then processing may return to decision step 1302. Otherwise, processing may proceed to steps 1330 and 1332. In step 1330, the minimum value variable may be set equal to a currently stored value for the minimum shadow value variable. In step 1332, the minimum shadow value variable may be unset (e.g., set to null). Following step 1332, processing may return to step 1302.

It should be appreciated that the dynamic normalization strategy 1300 may be implemented as a sequential process, as a set of parallel processes, or combinations thereof. It should also be understood that the dynamic normalization strategy 1300 may be applied to normalized sensor values from the trigger electrode, the curl electrode, or both. Further, it should be understood that dynamic normalization strategy 1300 may be applied to sensor values received from various types of proximity sensors, as described herein.

Figure 14:
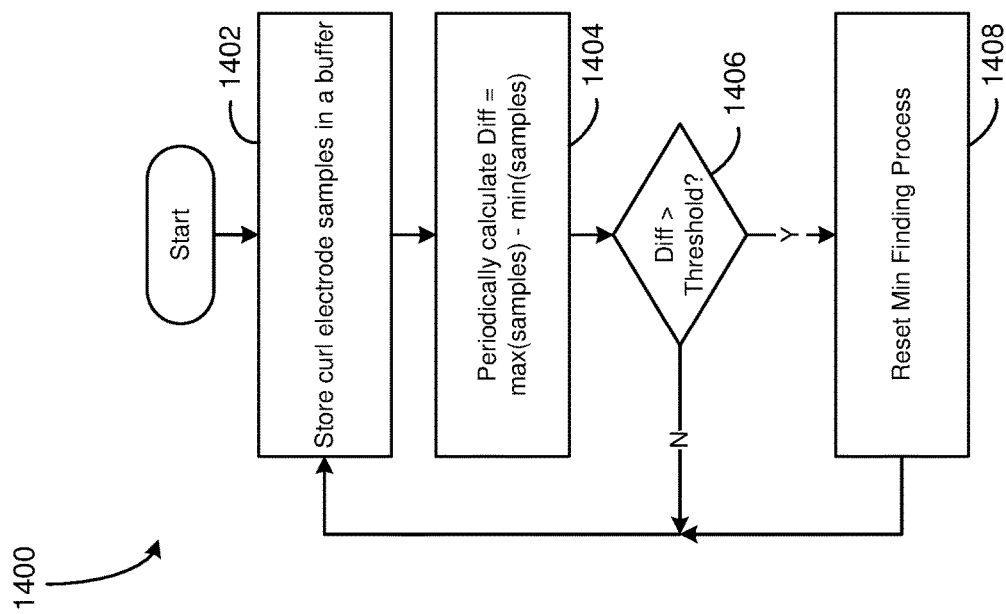
FIG. 14 is a flow diagram illustrating controller pickup detection in accordance with embodiments of this disclosure.

Turning to FIG. 14, a method 1400 of controller pickup detection can be used, for example, at decision step 1308 of FIG. 13. Method 1400 may also be used to detect various types of large controller movements. Beginning at step 1402, method 1400 includes storing curl electrode samples in a buffer. For example, the buffer may store curl electrode sensor values received over approximately the past half second, and these values may be continuously or periodically updated in the buffer (e.g., first in first out). Processing may proceed from step 1402 to step 1404.

As used herein, the term "buffer" generally refers to a data buffer. Typically, a data buffer is a region of a physical memory storage used to temporarily store data. For example, the data may be stored while it is being moved from one place to another. Alternatively, the data may be stored for a time and then deleted.

At step 1404, the method 1400 may include periodically determining a difference between one or more maximum sample values stored in the buffer and one or more minimum sample values stored in the buffer. For example, a minimum value stored in the buffer may be subtracted from a maximum value stored in the buffer, and the result may be stored as a difference variable. Processing may proceed from step 1404 to decision step 1406.

At decision step 1406, method 1400 may include determining if the difference determined at step 1404 is greater than a threshold value. The threshold value may be selected to ensure that it is exceeded only when a user picks up, hands off, and/or sets down the controller, and/or when the user moves the index finger very quickly. If the threshold is not exceeded, then processing may return to step 1402. Otherwise, processing may proceed to step 1408.

At step 1408, method 1400 may reset a minimum value search process. For example, the minimum value variable for the curl electrode sensor values may be reset (e.g., to null or to a large number). Resetting the minimum value search process may result in occasional false positives. However, the reset and the search for a new minimum is of relatively low cost, thus minimizing the impact of the occasional false positives. Processing may return from step 1408 to step 1402.

It should be appreciated that method 1400 may be implemented as a sequential process, as a set of parallel processes, or combinations thereof. It should also be understood that method 1400 may be applied to sensor values received from various types of proximity sensors, as described herein.

Figure 15:
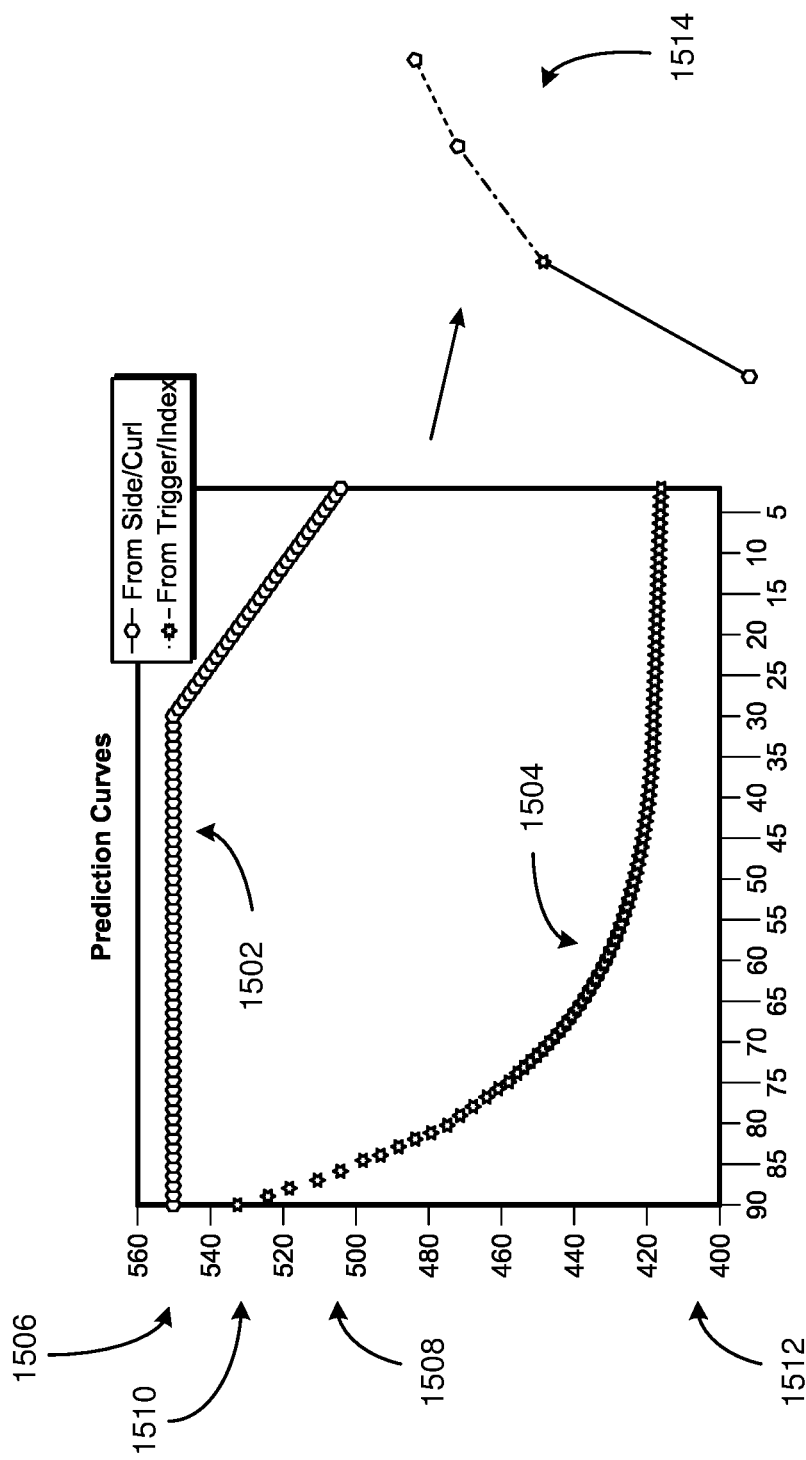
FIG. 15 is a graphical illustration depicting a two-segment fit achieved by fitting generic prediction curves to minimum and maximum values determined through dynamic normalization in accordance with embodiments of this disclosure.

Turning to FIG. 15, the dynamically normalized sensor values may be used in a two-segment fit procedure. This procedure achieves a two-segment fit by fitting generic prediction curves 1502 and 1504 to the minimum and maximum values determined through dynamic normalization. For example, curve 1502 may be for the curl electrode, and it may be fit to an ordinate axis based on maximum and minimum curl electrode sensor values 1506 and 1508. Similarly, curve 1504 may be for the trigger electrode, it may be fit to an ordinate axis based on maximum and minimum trigger electrode values 1510 and 1512. The abscissa may correspond to degrees. For example, the left side of the graph may correspond to a maximum curl (e.g., ninety degrees) for a trigger touch position of a one-dimensional curl projection 1514 of the rendered trigger finger. The right side of the graph may correspond to a minimum curl (e.g., zero degrees) for a pointed position of the one-dimensional curl projection 1514 trigger finger. The two-segment fit may avoid information loss by immediately projecting to a one-dimensional curl. The two-segment fit also simplifies reasoning how to blend through crossover regions of sensor values.

As used herein, "two-segment fit" generally refers to curve fitting of two-dimensional data. Curve fitting is the process of constructing a curve, or mathematical function, that has the best fit to a series of data points, possibly subject to constraints. Curve fitting can involve either interpolation, where an exact fit to the data is required, or smoothing, in which a "smooth" function is constructed that approximately fits the data. Fitted curves can be used as an aid for data visualization, to infer values of a function where no data are available, and to summarize the relationships among two or more variables.

Figure 16:
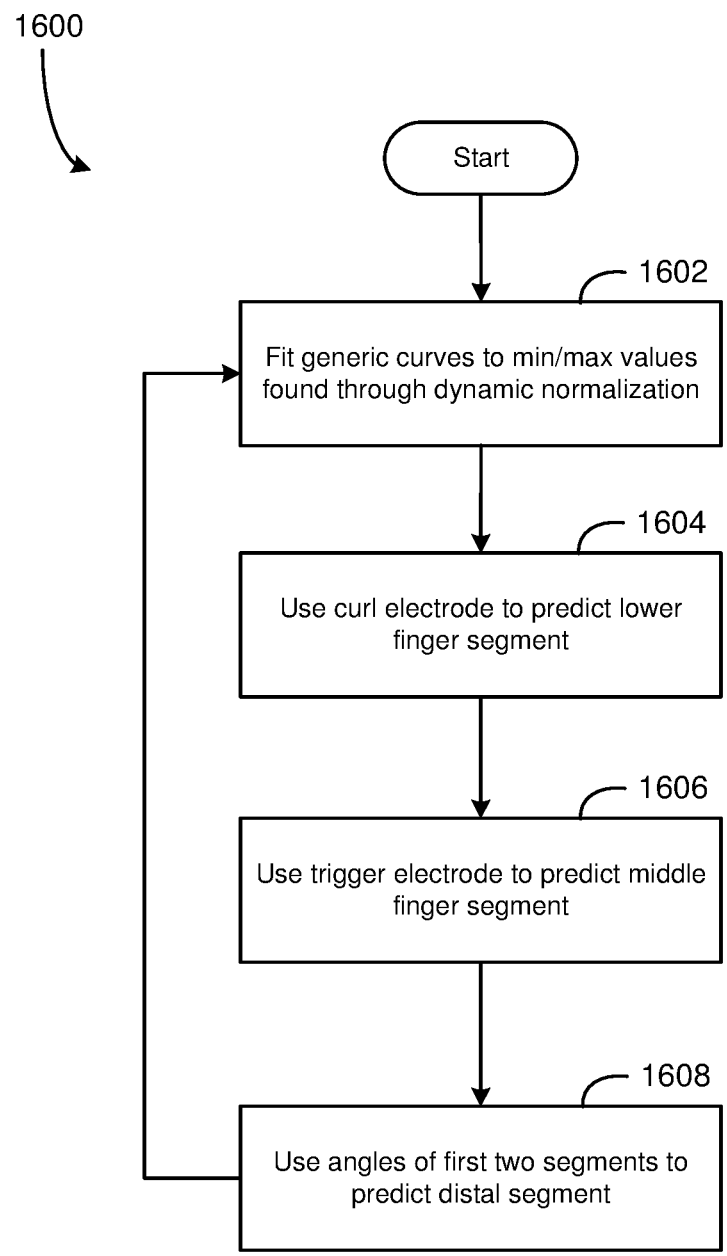
FIG. 16 is a flow diagram illustrating a two-segment fit process in accordance with embodiments of this disclosure.

Turning to FIG. 16, an example two-segment fit process 1600 may begin at step 1602, in which generic curves are fit to the maximum and minimum values found through dynamic normalization as shown, for example, in FIG. 15. Processing may proceed from step 1602 to step 1604.

At step 1604, process 1600 may include using the curl electrode curve and a current sensor value received from the curl electrode to predict an angle of deflection for a lower finger segment. Processing may proceed from step 1604 to step 1606.

At step 1606, process 1600 may include using the trigger electrode curve and a current sensor value received from the trigger electrode to predict an angle of deflection for a middle finger segment. Processing may proceed from step 1606 to step 1608.

At step 1608, process 1600 may include using the angle of deflection α for the base finger segment and the angle of deflection β for the middle finger segment to determine an angle of deflection γ for a distal finger segment. For example, given a $αβ_{max}$ (e.g., 80 degrees) and a $γ_{max}$ (e.g., 20 degrees), γ may be determined as follows:

$$γ=(α+β)/(αβ_{max}*γ_{max}).$$

Alternatively or additionally, γ may be determined using a look up table of predetermined γ angles indexed by α and β pairs. The system may dynamically create a finger pose by directly mapping α, β, and γ to joints of the trigger finger.

Figure 17:
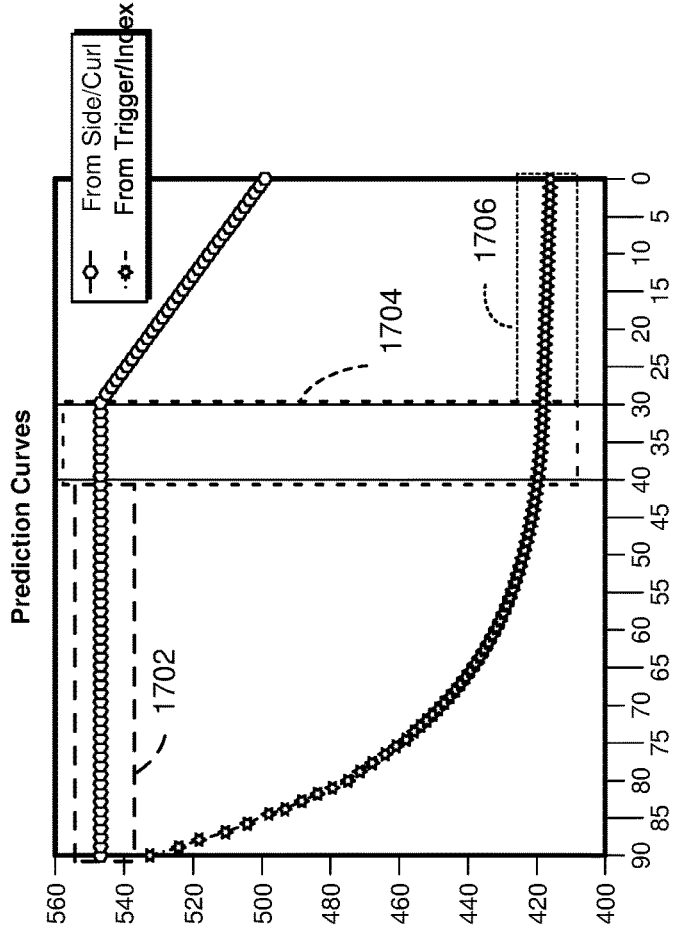
FIG. 17 is a graphical illustration depicting zones of the two-segment fit for which educated guess predictions may be made in accordance with embodiments of this disclosure.
Figure 17:
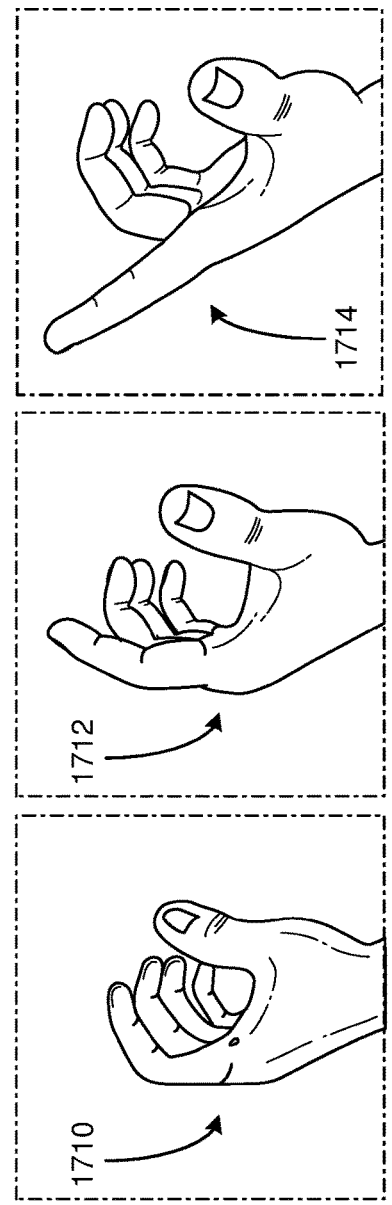

Turning to FIG. 17, some implementations may forego determining γ because it is possible to select one of three or more prerecorded finger poses 1710-1712 based on the α and β values without using a γ value. For example, one may predict a 1D finger curl based on the α and β values without using a γ value and select one of three or more prerecorded finger poses 1710-1712 based on the predicted curl. Alternatively or additionally, one may select a finger pose using a lookup table of prerecorded finger poses 1710-1714 indexed by α and β pairs. Processing may return from step 1608 to step 1602.

Continuing with reference to FIG. 17, the two-segment fit may be characterized by various zones for which educated guess predictions may be made. For example, in a first zone 1702, there is no new data from the curl electrode, but a maximum angular deflection of the lower finger segment may be used to render the base of the finger as curled in against a side of the controller side. Additionally, in a second zone 1704, the bottom segment of the trigger finger may be pressed against the controller and a tip of the trigger finger may be lifted away from the trigger. In this zone, the sensed values do not exhibit sufficient variation to produce meaningful trigger finger animation. However, zone 1704 is very small and is an awkward position for the user to hold. The rendering of the trigger finger in zone 1704, may be achieved by making no change to the angles of deflection and/or by using a default set of angles. Also, in a third zone 1706, there is no data from the trigger electrode (e.g., constant minimum sensor value), so predictions for both finger segments may be determined based on sensor values received from the curl electrode. A process for making these predictions smoothly is detailed below with reference to FIG. 18.

Figure 18:
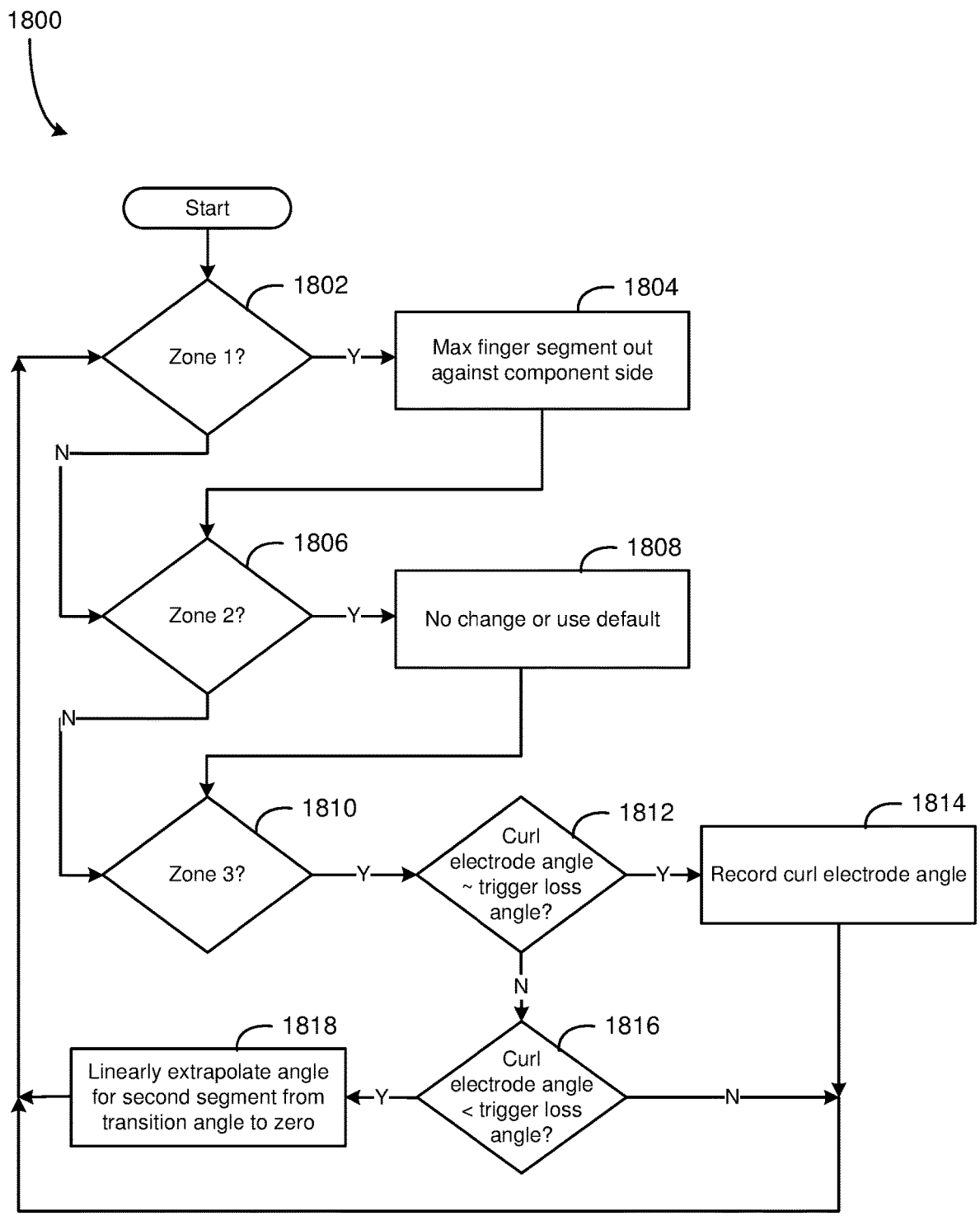
FIG. 18 is a flow diagram illustrating educated guess prediction in accordance with embodiments of this disclosure.

Referring to FIG. 18, a method 1800 of making educated guess predictions begins at decision step 1802, in which a determination is made if the received sensor values correspond to the first zone. If not, the processing may proceed to decision step 1806. Otherwise, processing may proceed to step 1804, in which a maximum angular deflection of the lower finger segment may be used to render the base of the finger as curled in against a side of the controller side. Processing may proceed from step 1804 to decision step 1806.

At decision step 1806, method 1800 may determine if the received sensor values correspond to the second zone. If not, the processing may proceed to decision step 1810. Otherwise, processing may proceed to step 1808, in which no changes may be made to the angles of deflection and/or a default set of angles may be used. Processing may proceed from step 1808 to decision step 1810.

At decision step 1810, method 1800 may determine if the received sensor values correspond to the third zone. If not, then processing may return to decision step 1802. Otherwise, processing may proceed to decision step 1812, in which a determination may be made whether a curl electrode angle is within a predetermined range of a trigger loss angle. The trigger loss angle may be a predetermined angle chosen to represent an angle at which the trigger is lost (e.g., 40 degrees). If it is determined, at decision step 1812, that the curl electrode angle is not close to the trigger loss angle, then processing may proceed to decision step 1816. Otherwise, processing may proceed to step 1814, at which the curl electrode angle is recorded as curl_at_idx_loss. Processing may return from step 1814 to decision step 1802.

At decision step 1816, method 1800 may determine if a predicted index angle pre_idx determined from a current curl electrode angle alpha is less than the trigger loss angle idx_threshold. If not, then processing may return to step 1802. Otherwise, processing may proceed to step 1818, at which the angle of deflection beta_deg for the second segment may be linearly extrapolated from a transition angle transition_curl_angle to zero, where the transition angle may be determined from the recorded curl_at_idx_loss. For example, the prediction may be made as follows:

if (pred_idx<idx_threshold){beta_deg=min((alpha/
      transition_curl_angle*idx_threshold),idx_threshold).

Processing may return from step 1818 to step 1802.

Figure 19:
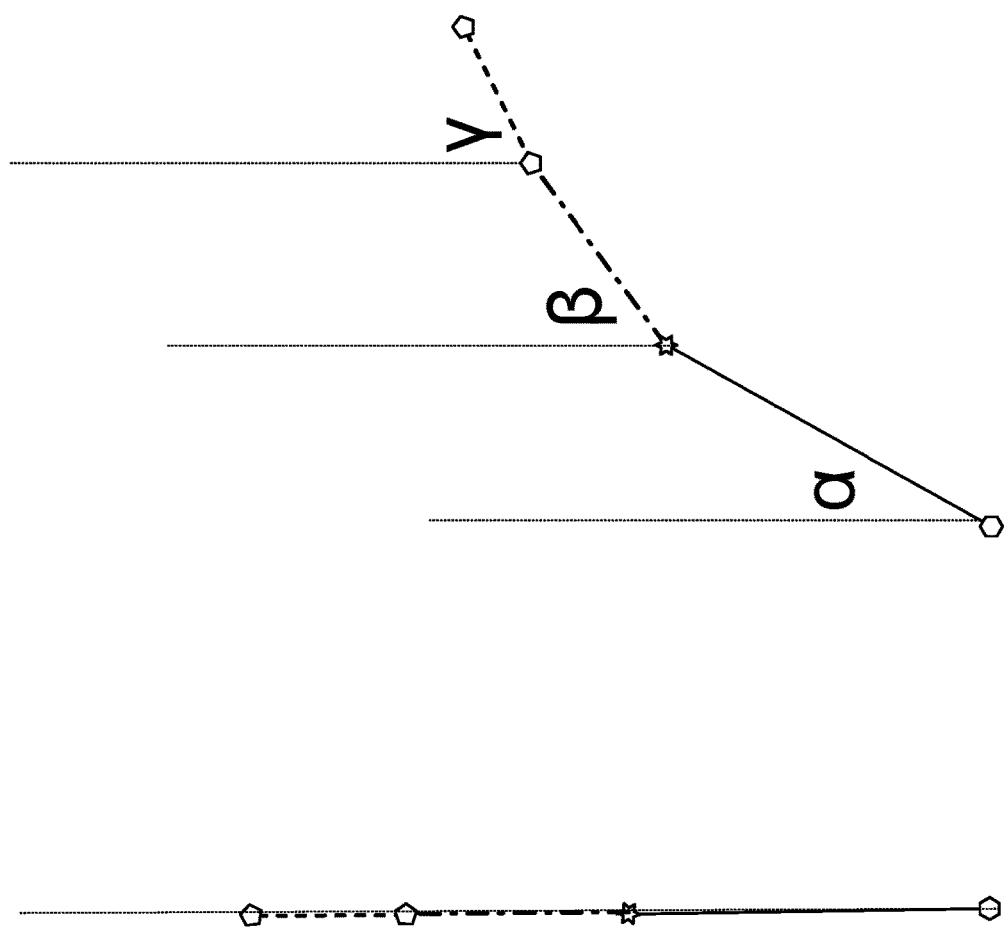
FIG. 19 is a graphical illustration depicting a one-dimensional curl projection from a joint model in accordance with embodiments of this disclosure.

Turning to FIG. 19, a one-dimensional curl projection from a joint model is shown. As used herein, "one-dimensional curl projection" refers to determination of a set of angles used in a joint model for rendering a trigger finger in VR. Given a maximum curl curl_max and angles of deflection α, β, and γ for each segment, the disclosed system and method may determine a projected curl as follows:

$$curl=(α+β+γ)/curl\_max.$$

The total min/max may be the sum of the mins/maxes of the individual joints as previously described (e.g., total maximum curl of 90 degrees). The resulting one one-dimensional curl projection value may be used to create the analog rendering in VR by pre-recording poses of the finger corresponding to various degrees. Accordingly, the system may map from the one-dimensional curl projection value to a finger pose. This procedure is an alternative to directly mapping α, β, and γ to joints of the trigger finger and creating a pose dynamically from this mapping. Alternatively, some implementations may determine the projected curl using a lookup table of projected curl values indexed by α and β pairs, and determine a pre-recorded pose based on the projected curl. For example, some implementations may determine the projected curl using a lookup table of projected curl values indexed by α and β pairs. With the information acquired by any of these methodologies, the disclosed system may render the trigger finger in a corresponding pose. A series of such renderings over time as the trigger finger moves produces an analog rendering corresponding to an animation of the moving trigger finger.

Rendering the trigger finger may provide feedback to opponents, teammates, and others. Use proximity sensors allows the VR system to predict the engagement of the trigger in time to render it accurately in terms of timing. Use of two or more proximity sensors, such as a trigger electrode and a curl electrode, allows an analog rendering showing movement between three or more positions. This more accurate feedback enhances user experiences.

EXAMPLE EMBODIMENTS

Example 1. A computer-implemented method may include: receiving, by a computing device, input from two or more proximity sensors configured to sense proximity, of two or more portions of a trigger finger of a user, to a trigger of a controller and to at least one part of the controller proximate to the trigger; and generating, by the computing device, an analog rendering of the trigger finger in response to the input from the two or more proximity sensors.

Example 2. The computer-implemented method of Example 1, wherein the two or more proximity sensors include at least two capacitive sensors comprising: a curl electrode positioned on an outside of the controller, alongside and below the trigger, wherein the curl electrode is configured to detect how far a base of the trigger finger is lifting away from the controller; and a trigger electrode positioned in the trigger, wherein the trigger electrode is configured to detect how close the trigger finger is to touching the trigger.

Example 3. The computer-implemented method of any of Examples 1 and 2, further comprising: using, by the computing device, a dynamic normalization strategy to find a range of values of sensor data for the curl electrode and the trigger electrode.

Example 4. The computer-implemented method of any of Examples 1-3, wherein the dynamic normalization strategy detects and responds to a movement of the controller having a magnitude above a threshold value by: storing, by the computing device, curl electrode sample values in a buffer; determining, by the computing device, a difference between one or more maximum sample values stored in the buffer and one or more minimum sample values stored in the buffer; determining, by the computing device, if the difference exceeds the threshold value, wherein the threshold value is selected to ensure that the threshold value is exceeded only when a user at least one of picks up the controller, releases the controller, or moves the trigger finger at a rate that exceeds a predetermined rate; and resetting, by the computing device in response to the difference exceeding the threshold value, a minimum value variable for curl electrode sensor values.

Example 5. The computer-implemented method of any of Examples 1-4, further comprising: fitting, by the computing device, predetermined curves to the range of values found by application of the dynamic normalization strategy, wherein the predetermined curves include a curl electrode curve and a trigger electrode curve; using, by the computing device, the curl electrode curve and a current sensor value received from the curl electrode to predict an angle of deflection for a lower finger segment of the trigger finger; using, by the computing device, the trigger electrode curve and a current sensor value received from the trigger electrode to predict an angle of deflection for a middle finger segment; and using, by the computing device, the angle of deflection for the lower finger segment and the angle of deflection for the middle finger segment to determine an angle of deflection for a distal finger segment.

Example 6. The computer-implemented method of any of Examples 1-5, wherein generating the analog rendering comprises: determining, by the computing device, if received sensor values correspond to a zone in which there is no new data from the curl electrode; and using, by the computing device in response to determining that the received sensor values correspond to the zone, a maximum angular deflection of the lower finger segment to render a base of the trigger finger as curled in against a side of the controller.

Example 7. The computer-implemented method of any of Examples 1-6, wherein generating the analog rendering comprises: determining, by the computing device, if received sensor values correspond to a zone in which the lower finger segment may be pressed against the controller and a tip of the trigger finger may be lifted away from the trigger; and using, by the computing device in response to determining that the received sensor values correspond to the zone, a default set of angles to render the trigger finger.

Example 8. The computer-implemented method of any of Examples 1-7, wherein generating the analog rendering comprises: determining, by the computing device, if received sensor values correspond to a zone in which there is no data from the trigger electrode; and determining, by the computing device in response to determining that the received sensor values correspond to the zone, the angle of deflection for the lower finger segment and the angle of deflection for the middle finger segment based on sensor values received from the curl electrode.

Example 9. The computer-implemented method of any of Examples 1-8, wherein generating the analog rendering further comprises: determining, by the computing device in response to determining that the received sensor values correspond to the zone, if a curl electrode angle is less than a predetermined trigger loss angle; and determining, by the computing device in response to determining that the curl electrode angle is less than the predetermined trigger loss angle, the angle of deflection for the middle finger segment by linearly extrapolating the angle of deflection for the middle finger segment from a transition angle to zero.

Example 10. The computer-implemented method of any of Examples 1-9, wherein generating the analog rendering comprises: determining, by the computing device, a projected curl based on a predetermined maximum curl and the angle of deflection for the lower finger segment, the angle of deflection for the middle finger segment, the angle of deflection for the distal finger segment.

Example 11. A system may include: at least one physical processor; and physical memory comprising computer-executable instructions that, when executed by the at least one physical processor, cause the at least one physical processor to: receive input from two or more proximity sensors configured to sense proximity, of two or more portions of a trigger finger of a user, to a trigger of a controller and to at least one part of the controller proximate to the trigger; and generate an analog rendering of the trigger finger in response to the input from the two or more proximity sensors.

Example 12. The system of Example 11, wherein the two or more proximity sensors include at least two capacitive sensors comprising: a curl electrode positioned on an outside of the controller, alongside and below the trigger, wherein the curl electrode is configured to detect how far a base of the trigger finger is lifting away from the controller; and a trigger electrode positioned in the trigger, wherein the trigger electrode is configured to detect how close the trigger finger is to touching the trigger.

Example 13. The system of any of Examples 11 or 12, wherein the instructions further cause the at least one physical processor to: use a dynamic normalization strategy to find a range of values of sensor data for the curl electrode and the trigger electrode.

Example 14. The system of any of Examples 11-13, wherein the dynamic normalization strategy detects and responds to a movement of the controller having a magnitude above a threshold value by: storing curl electrode sample values in a buffer; determining a difference between one or more maximum sample values stored in the buffer and one or more minimum sample values stored in the buffer; determining if the difference exceeds the threshold value, wherein the threshold value is selected to ensure that the threshold value is exceeded only when a user at least one of picks up the controller, releases the controller, or moves the trigger finger at a rate that exceeds a predetermined rate; and resetting, in response to the difference exceeding the threshold value, a minimum value variable for curl electrode sensor values.

Example 15. The system of any of Examples 11-14, wherein the instructions further cause the at least one physical processor to: fit predetermined curves to the range of values found by application of the dynamic normalization strategy, wherein the predetermined curves include a curl electrode curve and a trigger electrode curve; use the curl electrode curve and a current sensor value received from the curl electrode to predict an angle of deflection for a lower finger segment of the trigger finger; use the trigger electrode curve and a current sensor value received from the trigger electrode to predict an angle of deflection for a middle finger segment; and use the angle of deflection for the lower finger segment and the angle of deflection for the middle finger segment to determine an angle of deflection for a distal finger segment.

Example 16. The system of any of Examples 11-15, wherein the instructions cause the at least one physical processor to generate the analog rendering at least in part by: determining if received sensor values correspond to a zone in which there is no new data from the curl electrode; and using, in response to determining that the received sensor values correspond to the zone, a maximum angular deflection of the lower finger segment to render a base of the trigger finger as curled in against a side of the controller.

Example 17. The system of any of Examples 11-16, wherein the instructions cause the at least one physical processor to generate the analog rendering at least in part by: determining if received sensor values correspond to a zone in which the lower finger segment may be pressed against the controller and a tip of the trigger finger may be lifted away from the trigger; and using, in response to determining that the received sensor values correspond to the zone, a default set of angles to render the trigger finger.

Example 18. The system of any of Examples 11-17, wherein the instructions cause the at least one physical processor to generate the analog rendering at least in part by: determining if received sensor values correspond to a zone in which there is no data from the trigger electrode; and determining, in response to determining that the received sensor values correspond to the zone, the angle of deflection for the lower finger segment and the angle of deflection for the middle finger segment based on sensor values received from the curl electrode.

Example 19. The system of any of Examples 11-18, wherein the instructions cause the at least one physical processor to generate the analog rendering at least in part by: determining, in response to determining that the received sensor values correspond to the zone, if a curl electrode angle is less than a predetermined trigger loss angle; and determining, in response to determining that the curl electrode angle is less than the predetermined trigger loss angle, the angle of deflection for the middle finger segment by linearly extrapolating the angle of deflection for the middle finger segment from a transition angle to zero.

Example 20. A non-transitory computer-readable medium may include one or more computer-executable instructions that, when executed by at least one processor of a computing device, cause the computing device to: receive input from two or more proximity sensors configured to sense proximity, of two or more portions of a trigger finger of a user, to a trigger of a controller and to at least one part of the controller proximate to the trigger; and generate an analog rendering of the trigger finger in response to the input from the two or more proximity sensors.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive sensory signals to be transformed, transform the signals, output a result of the transformation to generate an analog rendering of a trigger finger, and use the result of the transformation to render the trigger finger. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The invention claimed is:

1. A computer-implemented method comprising:
    receiving, by a computing device, input from two or more proximity sensors configured to sense proximity of two or more portions of a trigger finger of a user to a trigger of a controller and to at least one part of the controller proximate to the trigger, wherein the two or more proximity sensors include at least two capacitive sensors comprising:
        a curl electrode positioned on an outside of the controller, alongside and below the trigger, wherein the curl electrode is configured to detect how far a base of the trigger finger is lifting away from the controller; and
        a trigger electrode positioned in the trigger, wherein the trigger electrode is configured to detect how close the trigger finger is to touching the trigger;
    generating, by the computing device, an analog rendering of the trigger finger in response to the input from the two or more proximity sensors and
    using, by the computing device, a dynamic normalization strategy to find a range of values of sensor data for the curl electrode and the trigger electrode,
    wherein the dynamic normalization strategy detects and responds to a movement of the controller having a magnitude above a threshold value by:
        storing, by the computing device, curl electrode sample values in a buffer;
        determining, by the computing device, a difference between one or more maximum sample values stored in the buffer and one or more minimum sample values stored in the buffer;
        determining, by the computing device, if the difference exceeds the threshold value, wherein the threshold value is selected to ensure that the threshold value is exceeded only when a user performs at least one of picking up the controller, releasing the controller, or moving the trigger finger at a rate that exceeds a predetermined rate; and
        resetting, by the computing device in response to the difference exceeding the threshold value, a minimum value variable for curl electrode sensor values.

2. The computer-implemented method of claim 1, further comprising:
    fitting, by the computing device, predetermined curves to the range of values found by application of the dynamic normalization strategy, wherein the predetermined curves include a curl electrode curve and a trigger electrode curve;
    using, by the computing device, the curl electrode curve and a current sensor value received from the curl electrode to predict an angle of deflection for a lower finger segment of the trigger finger;
    using, by the computing device, the trigger electrode curve and a current sensor value received from the trigger electrode to predict an angle of deflection for a middle finger segment; and
    using, by the computing device, the angle of deflection for the lower finger segment and the angle of deflection for the middle finger segment to determine an angle of deflection for a distal finger segment.

3. The computer-implemented method of claim 2, wherein generating the analog rendering comprises:
    determining, by the computing device, if received sensor values correspond to a zone in which there is no new data from the curl electrode; and
    using, by the computing device in response to determining that the received sensor values correspond to the zone, a maximum angular deflection of the lower finger segment to render a base of the trigger finger as curled in against a side of the controller.

4. The computer-implemented method of claim 2, wherein generating the analog rendering comprises:
    determining, by the computing device, if received sensor values correspond to a zone in which the lower finger segment may be pressed against the controller and a tip of the trigger finger may be lifted away from the trigger; and
    using, by the computing device in response to determining that the received sensor values correspond to the zone, a default set of angles to render the trigger finger.

5. The computer-implemented method of claim 2, wherein generating the analog rendering comprises:
    determining, by the computing device, if received sensor values correspond to a zone in which there is no data from the trigger electrode; and
    determining, by the computing device in response to determining that the received sensor values correspond to the zone, the angle of deflection for the lower finger segment and the angle of deflection for the middle finger segment based on sensor values received from the curl electrode.

6. The computer-implemented method of claim 5, wherein generating the analog rendering further comprises:
    determining, by the computing device in response to determining that the received sensor values correspond to the zone, if a curl electrode angle is less than a predetermined trigger loss angle; and determining, by the computing device in response to determining that the curl electrode angle is less than the predetermined trigger loss angle, the angle of deflection for the middle finger segment by linearly extrapolating the angle of deflection for the middle finger segment from a transition angle to zero.

7. The computer-implemented method of claim 2, wherein generating the analog rendering comprises:

determining, by the computing device, a projected curl based on a predetermined maximum curl and the angle of deflection for the lower finger segment, the angle of deflection for the middle finger segment, the angle of deflection for the distal finger segment.

8. A system comprising:

at least one physical processor; and physical memory comprising computer-executable instructions that, when executed by the at least one physical processor, cause the at least one physical processor to:

receive input from two or more proximity sensors configured to sense proximity of two or more portions of a trigger finger of a user to a trigger of a controller and to at least one part of the controller proximate to the trigger, wherein the two or more proximity sensors include at least two capacitive sensors comprising:

a curl electrode positioned on an outside of the controller, alongside and below the trigger, wherein the curl electrode is configured to detect how far a base of the trigger finger is lifting away from the controller; and a trigger electrode positioned in the trigger, wherein the trigger electrode is configured to detect how close the trigger finger is to touching the trigger;

generate an analog rendering of the trigger finger in response to the input from the two or more proximity sensors;

wherein the instructions further cause the at least one physical processor to: use a dynamic normalization strategy to find a range of values of sensor data for the curl electrode and the trigger electrode, wherein the dynamic normalization strategy detects and responds to a movement of the controller having a magnitude above a threshold value by:

storing curl electrode sample values in a buffer;

determining a difference between one or more maximum sample values stored in the buffer and one or more minimum sample values stored in the buffer;

determining if the difference exceeds the threshold value, wherein the threshold value is selected to ensure that the threshold value is exceeded only when a user performs at least one of picks up the controller, releases the controller, or moves the trigger finger at a rate that exceeds a predetermined rate; and resetting, in response to the difference exceeding the threshold value, a minimum value variable for curl electrode sensor values.

9. The system of claim 8, wherein the instructions further cause the at least one physical processor to:

fit predetermined curves to the range of values found by application of the dynamic normalization strategy, wherein the predetermined curves include a curl electrode curve and a trigger electrode curve;

use the curl electrode curve and a current sensor value received from the curl electrode to predict an angle of deflection for a lower finger segment of the trigger finger;

use the trigger electrode curve and a current sensor value received from the trigger electrode to predict an angle of deflection for a middle finger segment; and use the angle of deflection for the lower finger segment and the angle of deflection for the middle finger segment to determine an angle of deflection for a distal finger segment.

10. The system of claim 9, wherein the instructions cause the at least one physical processor to generate the analog rendering at least in part by:

determining if received sensor values correspond to a zone in which there is no new data from the curl electrode; and using, in response to determining that the received sensor values correspond to the zone, a maximum angular deflection of the lower finger segment to render a base of the trigger finger as curled in against a side of the controller.

11. The system of claim 9, wherein the instructions cause the at least one physical processor to generate the analog rendering at least in part by:

determining if received sensor values correspond to a zone in which the lower finger segment may be pressed against the controller and a tip of the trigger finger may be lifted away from the trigger; and using, in response to determining that the received sensor values correspond to the zone, a default set of angles to render the trigger finger.

12. The system of claim 9, wherein the instructions cause the at least one physical processor to generate the analog rendering at least in part by:

determining if received sensor values correspond to a zone in which there is no data from the trigger electrode; and determining, in response to determining that the received sensor values correspond to the zone, the angle of deflection for the lower finger segment and the angle of deflection for the middle finger segment based on sensor values received from the curl electrode.

13. The system of claim 12, wherein the instructions cause the at least one physical processor to generate the analog rendering at least in part by:

determining, in response to determining that the received sensor values correspond to the zone, if a curl electrode angle is less than a predetermined trigger loss angle; and determining, in response to determining that the curl electrode angle is less than the predetermined trigger loss angle, the angle of deflection for the middle finger segment by linearly extrapolating the angle of deflection for the middle finger segment from a transition angle to zero.

14. A non-transitory computer-readable medium comprising one or more computer-executable instructions that, when executed by at least one processor of a computing device, cause the computing device to:

receive input from two or more proximity sensors configured to sense proximity, of two or more portions of a trigger finger of a user, to a trigger of a controller and to at least one part of the controller proximate to the trigger;

wherein the two or more proximity sensors include at least two capacitive sensors comprising:

a curl electrode positioned on an outside of the controller, alongside and below the trigger, wherein the curl electrode is configured to detect how far a base of the trigger finger is lifting away from the controller; and a trigger electrode positioned in the trigger, wherein the trigger electrode is configured to detect how close the trigger finger is to touching the trigger;

generate an analog rendering of the trigger finger in response to the input from the two or more proximity sensors;

wherein the instructions further cause the computing device to: use a dynamic normalization strategy to find a range of values of sensor data for the curl electrode and the trigger electrode, wherein the dynamic normalization strategy detects and responds to a movement of the controller having a magnitude above a threshold value by:

storing curl electrode sample values in a buffer;

determining a difference between one or more maximum sample values stored in the buffer and one or more minimum sample values stored in the buffer;

determining if the difference exceeds the threshold value, wherein the threshold value is selected to ensure that the threshold value is exceeded only when a user performs at least one of picks up the controller, releases the controller, or moves the trigger finger at a rate that exceeds a predetermined rate; and resetting, in response to the difference exceeding the threshold value, a minimum value variable for curl electrode sensor values.

15. The non-transitory computer-readable medium of claim 14, wherein the instructions further cause the computing device to:

fit predetermined curves to the range of values found by application of the dynamic normalization strategy, wherein the predetermined curves include a curl electrode curve and a trigger electrode curve;

use the curl electrode curve and a current sensor value received from the curl electrode to predict an angle of deflection for a lower finger segment of the trigger finger;

use the trigger electrode curve and a current sensor value received from the trigger electrode to predict an angle of deflection for a middle finger segment; and use the angle of deflection for the lower finger segment and the angle of deflection for the middle finger segment to determine an angle of deflection for a distal finger segment.

16. The non-transitory computer-readable medium of claim 15, wherein the instructions cause the computing device to generate the analog rendering at least in part by:

determining if received sensor values correspond to a zone in which there is no new data from the curl electrode; and using, in response to determining that the received sensor values correspond to the zone, a maximum angular deflection of the lower finger segment to render a base of the trigger finger as curled in against a side of the controller.

17. The non-transitory computer-readable medium of claim 15, wherein the instructions cause the computing device to generate the analog rendering at least in part by:

determining if received sensor values correspond to a zone in which the lower finger segment may be pressed against the controller and a tip of the trigger finger may be lifted away from the trigger; and using, in response to determining that the received sensor values correspond to the zone, a default set of angles to render the trigger finger.

18. The non-transitory computer-readable medium of claim 15, wherein the instructions cause the computing device to generate the analog rendering at least in part by:

determining if received sensor values correspond to a zone in which there is no data from the trigger electrode; and determining, in response to determining that the received sensor values correspond to the zone, the angle of deflection for the lower finger segment and the angle of deflection for the middle finger segment based on sensor values received from the curl electrode.

19. The non-transitory computer-readable medium of claim 18, wherein the instructions cause the computing device to generate the analog rendering at least in part by:

determining, in response to determining that the received sensor values correspond to the zone, if a curl electrode angle is less than a predetermined trigger loss angle; and determining, in response to determining that the curl electrode angle is less than the predetermined trigger loss angle, the angle of deflection for the middle finger segment by linearly extrapolating the angle of deflection for the middle finger segment from a transition angle to zero.

* * * * *